United States Patent
Slabaugh et al.

(10) Patent No.: US 11,833,769 B2
(45) Date of Patent: Dec. 5, 2023

(54) SURFACE MODIFICATION OF ELASTOMERS VIA ENCAPSULATED GLASS ($SIO_2$)

(71) Applicant: Apple Inc., Cupertino, CA (US)

(72) Inventors: Scott W. Slabaugh, Gilroy, CA (US); Liliya Lyandres, Sunnyvale, CA (US); Warren Taylor, Felton, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 17/013,708

(22) Filed: Sep. 7, 2020

(65) Prior Publication Data

US 2021/0094249 A1    Apr. 1, 2021

Related U.S. Application Data

(60) Provisional application No. 62/906,448, filed on Sep. 26, 2019.

(51) Int. Cl.
| | | |
|---|---|---|
| *B29C 71/00* | (2006.01) | |
| *B29C 71/04* | (2006.01) | |

(52) U.S. Cl.
CPC .......... *B29C 71/0063* (2013.01); *B29C 71/04* (2013.01)

(58) Field of Classification Search
CPC ............................ B29C 71/0063; B29C 71/04
USPC ........................................................ 428/429
See application file for complete search history.

(56) References Cited

U.S. PATENT DOCUMENTS

| | | | |
|---|---|---|---|
| 5,693,928 A | 12/1997 | Egitto et al. | |
| 2013/0250425 A1* | 9/2013 | Pett | G02B 1/118 |
| | | | 264/1.27 |
| 2019/0284443 A1* | 9/2019 | Sherman | C09J 7/10 |

FOREIGN PATENT DOCUMENTS

| | | | | |
|---|---|---|---|---|
| CN | 1341083 A | * | 3/2002 | ............. B32B 17/10 |
| CN | 1341083 A | | 3/2002 | |
| DE | 1811742 A1 | | 7/1970 | |
| GB | 1244208 A | | 8/1971 | |
| WO | WO 2000/041978 A1 | | 7/2000 | |

OTHER PUBLICATIONS

Translation of CN1341083, Mar. 20, 2002. (Year: 2002).*

* cited by examiner

*Primary Examiner* — Hui H Chin
(74) *Attorney, Agent, or Firm* — BakerHostetler

(57) ABSTRACT

A composite is provided to include an elastomer substrate comprising methyl groups. The composite may also include a layer of glass comprising $SiO_2$ formed over the elastomer substrate. A method of fabricating the composite is provided. The method may include diffusing an ozone-rich gas into the substrate of an elastomer substrate comprising methyl groups. The method may also include exposing the elastomer substrate to UV radiation for a period of time. The method may further include converting a surface portion of the elastomer substrate into a layer of glass formed over the elastomer substrate.

17 Claims, 20 Drawing Sheets

:
SURFACE MODIFICATION OF ELASTOMERS VIA ENCAPSULATED GLASS (SIO₂)

PRIORITY

The disclosure claims the benefit under 35 U.S.C. § 119(e) of U.S. Provisional Patent Application No. 62/906,448, entitled "SURFACE MODIFICATION OF ELASTOMERS VIA ENCAPSULATED GLASS ($SiO_2$)," filed on Sep. 26, 2019, which is incorporated herein by reference in its entirety.

FIELD

The disclosure is directed to creating a high performance surface onto an elastomer containing methyl groups.

BACKGROUND

An elastomer, such as silicone, is soft and has good wear resistance and stain resistance. The elastomer also has a smooth surface. However, after the elastomer experiences wear cycles, the elastomer may become sticky or tacky, and may tend to collect dust or attract dust. It is desirable to develop a coating to make the surface of the elastomer less sticky or tacky and with a smooth haptic feel.

BRIEF SUMMARY

In one aspect, a composite is provided to include an elastomer substrate comprising methyl groups. The composite may also include a layer of glass comprising $SiO_2$ formed over the elastomer substrate.

In another aspect, a method of fabricating a composite is provided. The method may include diffusing an ozone-rich gas into the substrate of an elastomer substrate comprising methyl groups. The method may also include exposing the elastomer substrate to UV radiation for a period of time. The method may further include converting a surface portion of the elastomer substrate into a layer of glass formed over the elastomer substrate.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

The disclosure is directed to forming a high performance surface onto an elastomer containing methyl groups, such as silicone or silicone-based elastomer, among others. The disclosure provides a composite including a thin glass (e.g., $SiO_2$) coating over the elastomer. In some embodiments, the composite may optionally include a thin polymer coating over the glass coating. In some variations, the polymer coating is a silicone-based polymer coating, which is capable of stretching up to 200% and is elastic.

Glass Coating

Figure 1:
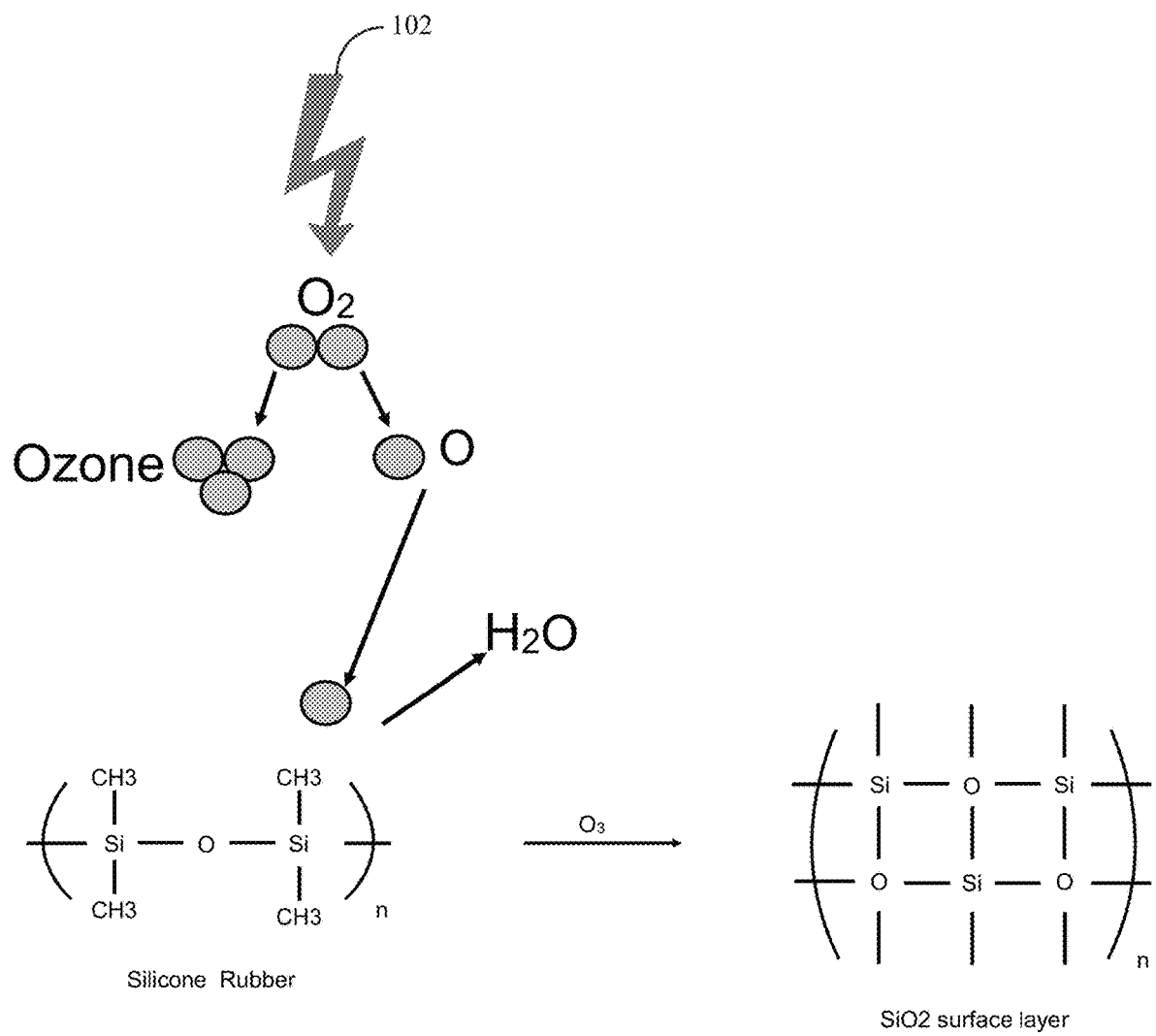
FIG. 1 illustrates converting a silicon rubber into a $SiO_2$ surface layer in an ozone rich-environment under an ultraviolet (UV) light in accordance with an embodiment of the disclosure.

FIG. 1 illustrates converting a silicon rubber or elastomer into a $SiO_2$ surface layer in an ozone rich-environment under a UV light in accordance with an embodiment of the disclosure. As shown, UV light 102 dissociates ozone into oxygen. The mechanism for dissociation of ozone is that the UV energy breaks one of the oxygen bonds in an ozone molecule by adding an UV energy to the ozone, catalyzing the ozone into oxygen.

The $SiO_2$ surface layer can be formed by converting the surface of the elastomer (e.g. silicone) into $SiO_2$ in an ozone-rich environment under the UV light 102 of specific energy, which can disassociate a methyl group, can then replace the methyl group with oxygen, and thus can create a high performance glass (e.g., $SiO_2$) coating layer.

The $SiO_2$ layer is dense and flexible, and can improve haptics, surface hardness, abrasion resistance, staining resistance, and reduction of oil diffusion of the elastomer.

Polydimethylsiloxane (PDMS), also known as dimethylpolysiloxane or dimethicone, is commonly referred to as silicones. The methyl group is one of common structural units of organic compounds, and includes three hydrogen atoms bonded to a carbon atom, which is linked to the remainder of the molecule. As shown in FIG. 1, the methyl hydrocarbon radical ($CH_3$) is converted into $SiO_2$.

Silicone elastomers are silicone-based polymers that have been vulcanized. Silicone is a polymer including silicon, carbon, hydrogen, and oxygen. Silicone is generally soft and has good wear resistance and stain resistance. Solid silicone sheets or solid molded silicone parts may vary in hardness from 10 durometer Shore A (soft) to 70 durometer Shore A (firm).

Figure 2:
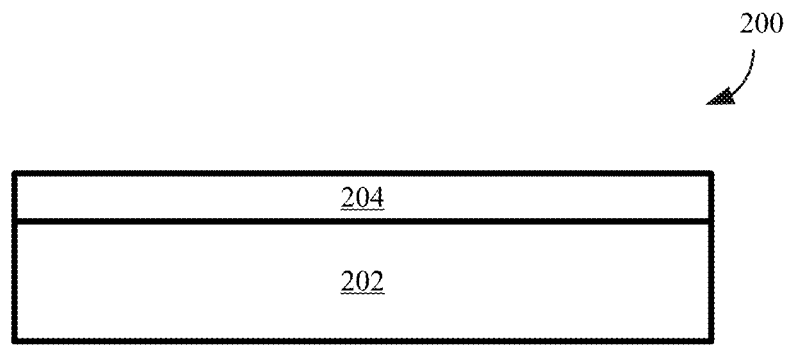
FIG. 2 illustrates a composite including a glass layer over a silicone substrate in accordance with an embodiment of the disclosure.

FIG. 2 illustrates a composite including a glass layer over a silicone substrate in accordance with an embodiment of the disclosure. As shown, a composite may include a glass layer 204 over a substrate of an elastomer 202 or an elastomer substrate, such as a silicone substrate. When an elastomer, such as silicone, is exposed to UV in an ozone-rich environment, the top few microns of the elastomer can react with ozone gas ($O_3$) and cleave the methyl groups from the silicone backbone, and can then replace the methyl groups with cross-linking siloxane bonds, thus creating a $SiO_2$ or glass-rich surface, which provides glass like properties on the surface of the elastomer.

In some variations, the composite including the elastomer and the glass layer can be stretched to be greater than 50% without cracking in the glass layer. In some variations, the composite including the elastomer and the glass layer can be stretched to be greater than 55% without cracking in the glass layer. In some variations, the composite including the elastomer and the glass layer can be stretched to be greater than 60% without cracking in the glass layer. In some variations, the composite including the elastomer and the glass layer can be stretched to be greater than 65% without cracking in the glass layer. In some variations, the composite including the elastomer and the glass layer can be stretched to be greater than 70% without cracking in the glass layer. In some variations, the composite including the elastomer and the glass layer can be stretched to be greater than 80% without cracking in the glass layer. In some variations, the composite including the elastomer and the glass layer can be stretched to be greater than 90% without cracking in the glass layer. In some variations, the composite including the elastomer and the glass layer can be stretched to be greater than 100% without cracking in the glass layer.

Soft Touch Coating

In some variations, $SiO_2$ may crack under extended stretching of the elastomer, for example, when the elastomer is stretched up to 100%. The thicker the glass layer, the larger chance of cracking may occur when stretching. Cracking of the $SiO_2$ layer may be resolved by adding a highly elastic polymer coating over the $SiO_2$ layer.

Figure 3A:
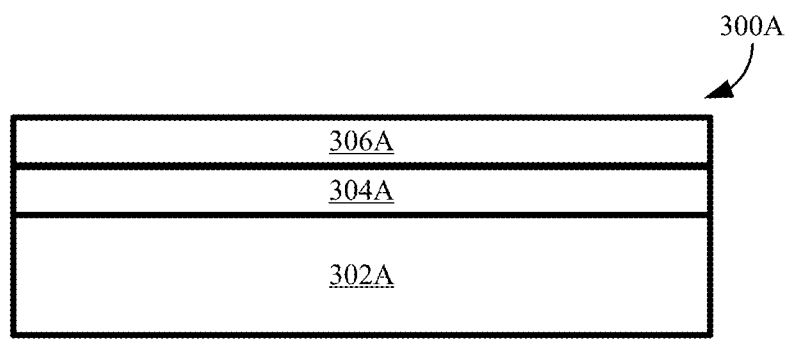
FIG. 3A illustrates a composite including a polymer coating over the glass layer of FIG. 2 in accordance with an embodiment of the disclosure.

FIG. 3A illustrates a composite including a polymer coating over the glass layer of FIG. 2 in accordance with an embodiment of the disclosure. As shown in FIG. 3A, a composite 300A can include a rigid pillar structure of glass layer ($SiO_2$) 304A between an elastomer substrate 302A and a polymer coating or a soft touch coating 306A. The soft touch coating is a silicone-based polymer, which has a good adhesion to the glass or $SiO_2$ and also has good adhesion to the silicone-based substrate. The soft touch coating also has good wear resistance and good stain resistance. The soft touch coating 306A may contain cracking from the glass layer 304A and/or isolate the cracking from the glass layer 304A, and make the rigid $SiO_2$ coating appear to be elastic. With the soft touch coating 306A, the composite 300A including the glass layer 304A can be stretched extensively (e.g. stretched to 100%) with reduced cracking or without any cracking.

Figure 3B:
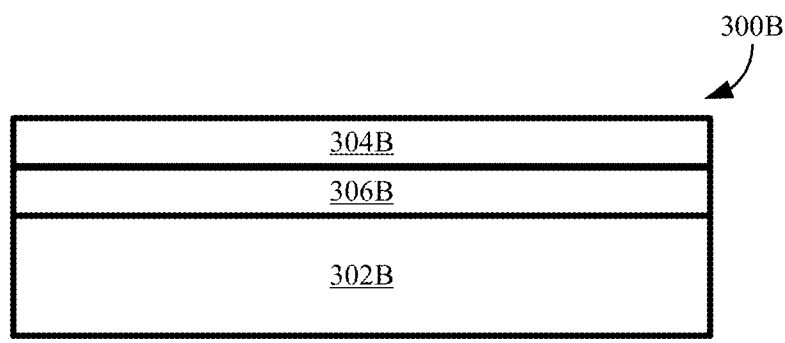
FIG. 3B illustrates a composite including a glass layer over a polymer coating in accordance with an embodiment of the disclosure.

FIG. 3B illustrates a composite including a glass layer over a polymer coating in accordance with an embodiment of the disclosure. As shown in FIG. 3B, a composite 300B can include a polymer coating or soft touch coating 306B between a rigid pillar structure of glass layer ($SiO_2$) 304B and an elastomer substrate 302B. The soft touch coating is a silicone-based polymer, which has a good adhesion to the glass or $SiO_2$ and also has good adhesion to the silicone-based substrate. The soft touch coating also has good wear resistance and good stain resistance. The soft touch coating 306B may contain cracking from the glass layer 304A and/or isolate the cracking from the glass layer 304B, and make the rigid $SiO_2$ coating appear to be elastic. With the soft touch coating 306B, the composite 300B including the glass layer 304B can be stretched extensively (e.g. stretched to 100%) with reduced cracking or without any cracking.

In some variations, the composite including the glass layer and soft touch coating can be stretched to 80% with cracking. In some variations, the composite including the glass layer and soft touch coating can be stretched to 90% with cracking. In some variations, the composite including the glass layer and soft touch coating can be stretched to 100% with cracking. In some variations, the composite including the glass layer and soft touch coating can be stretched to 110% with cracking. In some variations, the composite including the glass layer and soft touch coating can be stretched to 120% with cracking. In some variations, the composite including the glass layer and soft touch coating can be stretched to 130% with cracking.

Methods of Forming Glass Coating and Soft Touch Coating

Figure 4:
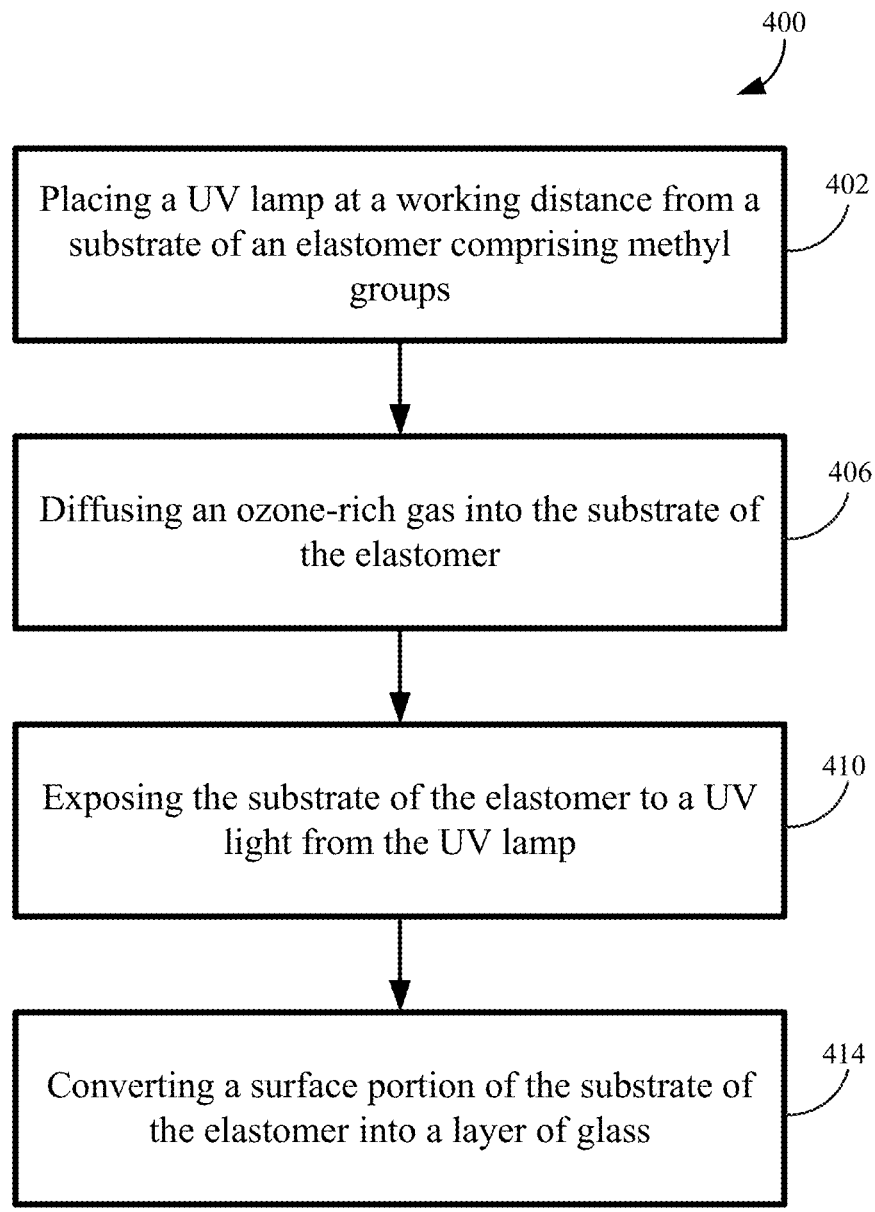
FIG. 4 is a flow chart illustrating the steps of forming a layer of glass over a substrate of an elastomer in accordance with an embodiment of the disclosure.

FIG. 4 is a flow chart illustrating the steps of forming a layer of glass over a substrate of an elastomer in accordance with an embodiment of the disclosure. A method 400 may include placing a UV lamp or a source of UV radiation at a working distance from a substrate of an elastomer comprising methyl groups at operation 402. The UV lamp provides a UV light or UV radiation.

The wavelength of the UV light is selected to break the ozone into oxygen ($O_2$) and O or break a Si—C bond. In some variations, the UV light may have a wavelength of 172 nm. The energy at this wavelength can break the ozone into oxygen ($O_2$) and O. In some variations, the UV light may have a wavelength of 254 nm. The energy at this wavelength can break the Si—C bond.

The working distance is the distance between the UV lamp and the substrate of the elastomer. The working distance may be selected from 1 mm to 6 mm for effective formation of the $SiO_2$ surface layer.

In some variations, the working distance is equal to or greater than 1 mm. In some variations, the working distance is equal to or greater than 2 mm. In some variations, the working distance is equal to or greater than 3 mm. In some variations, the working distance is equal to or greater than 4 mm. In some variations, the working distance is equal to or greater than 5 mm. In some variations, the working distance is equal to or less than 6 mm. In some variations, the working distance is equal to or less than 5 mm. In some variations, the working distance is equal to or less than 4 mm. In some variations, the working distance is equal to or less than 3 mm. In some variations, the working distance is equal to or less than 2 mm.

The method 400 may also include diffusing an ozone-rich gas into the substrate of the elastomer at operation 406. The ozone-rich gas may include ozone and impurity.

The method 400 may further include exposing the substrate of the elastomer to a UV light from the UV lamp for a period of time at operation 410. In some variations, the period of time may be at least 0.5 minutes. In some variations, the period of time may be at least 1 minute. In some variations, the period of time may be at least 1.5 minutes. In some variations, the period of time may be at least 2.0 minutes. In some variations, the period of time may be at least 2.5 minutes. In some variations, the period of time may be at least 3.0 minutes. In some variations, the period of time may be at least 3.5 minutes. In some variations, the period of time may be at least 4.0 minutes.

The thickness of the glass layer may increase with the exposure time initially and then may be saturated after a period of exposure time. Longer exposure time may not help increase the thickness of the glass layer any more.

The method may also include converting a surface portion of the substrate of the elastomer into a glass layer at operation 414. In some variations, the glass layer may have thickness ranging from 1 μm to 6 μm. When the glass layer becomes thicker, the surface becomes harder. However, when the thickness of the glass layer continues to increase, the composite or UV-treated PDMS may crack under extensive stretch (e.g. 100% stretching).

In some variations, the glass layer is equal to or greater than 1 μm thick. In some variations, the glass layer is equal to or greater than 2 μm thick. In some variations, the glass layer is equal to or greater than 3 μm thick. In some variations, the glass layer is equal to or greater than 4 μm thick. In some variations, the glass layer is equal to or greater than 5 μm thick. In some variations, the glass layer is equal to or less than 6 μm thick. In some variations, the glass layer is equal to or less than 5 μm thick. In some variations, the glass layer is equal to or less than 4 μm thick. In some variations, the glass layer is equal to or less than 3 μm thick. In some variations, the glass layer is equal to or less than 2 μm thick.

The method 400 may optionally include forming a soft touch coating over the glass layer. Soft touch coating can be applied via spray application process. In some variations, the soft touch coating may have thickness ranging from 1 μm to 6 μm.

In some variations, the soft touch coating is equal to or greater than 1 μm thick. In some variations, the soft touch coating is equal to or greater than 2 μm thick. In some variations, the soft touch coating is equal to or greater than 3 μm thick. In some variations, the soft touch coating is equal to or greater than 4 μm thick. In some variations, the soft touch coating is equal to or greater than 5 μm thick. In some variations, the soft touch coating is equal to or less than 6 μm thick. In some variations, the soft touch coating is equal to or less than 5 μm thick. In some variations, the soft touch coating is equal to or less than 4 μm thick. In some variations, the soft touch coating is equal to or less than 3 μm thick. In some variations, the soft touch coating is equal to or less than 2 μm thick.

Modulus, Hardness, COF, Oil Diffusion, and Stain Resistance

The benefits of forming a glass layer over the elastomer substrate may include providing an elastomer with a hard surface, improving haptic feel, and/or reducing stickiness, tackiness, and/or dust attraction. The benefits may also include increasing surface density for forming $SiO_2$ over the elastomer substrate. The benefits may also include improving hardness of the top surface of the elastomer. The benefits may also include reducing oil diffusion into silicone. The benefits may also include improvement of wear resistance with a soft touch coating. The benefits include The composite as shown in FIG. 2 and/or FIG. 3 provide increased wear resistance, abrasion resistance, staining resistance, reduction of oil diffusion, and improvement of haptic properties. The composite shown in FIG. 2 is a UV-treated elastomer. The composite shown in FIG. 3 is a UV-treated elastomer with a soft touch coating.

In some variations, the modulus of the UV-treated PDMS has a modulus of at least 30% higher than untreated PDMS. In some variations, the modulus of the UV-treated PDMS has a modulus of at least 40% higher than untreated PDMS. In some variations, the modulus of the UV-treated PDMS has a modulus of at least 50% higher than untreated PDMS.

In some variations, the UV-treated PDMS has a modulus of at least 25 MPa. In some variations, the UV-treated PDMS has a modulus of at least 30 MPa. In some variations, the UV-treated PDMS has a modulus of at least 35 MPa.

In some variations, the hardness of the UV-treated PDMS has a hardness of at least 30% higher than untreated PDMS. In some variations, the hardness of the UV-treated PDMS has a hardness of at least 40% higher than untreated PDMS. In some variations, the hardness of the UV-treated PDMS has a hardness of at least 50% higher than untreated PDMS.

Low Coefficient of Friction (COF) makes the UV-treated PDMS less sticky than the untreated PDMS after usages. Low COF also makes the PDMS less likely to collect dust or attract dust. In some variations, the kinetic COF of the UV-treated PDMS at 2500 wear cycles is equal to or less than 0.2, which is significantly lower than 0.68 for the untreated PDMS.

In some variations, the kinetic COF of the UV-treated PDMS at 2500 wear cycles is equal to or less than 0.18. In some variations, the kinetic COF of the UV-treated PDMS at 2500 wear cycles is equal to or less than 0.16. In some variations, the kinetic COF of the UV-treated PDMS at 2500 wear cycles is equal to or less than 0.14. In some variations, the kinetic COF of the UV-treated PDMS at 2500 wear cycles is equal to or less than 0.12. In some variations, the kinetic COF of the UV-treated PDMS at 2500 wear cycles is equal to or less than 0.10.

In some variations, the COF of the UV treated PDMS at 3000 cycles or higher cycles is equal to or less than 0.80, which is lower than the COF of 0.9 or higher for the untreated PDMS at 3000 cycles or higher cycles.

In some variations, the COF of the UV treated PDMS at 3000 cycles or higher cycles is equal to or less than 0.75. In some variations, the COF of the UV treated PDMS at 3000 cycles or higher cycles is equal to or less than 0.70. In some variations, the COF of the UV treated PDMS at 3000 cycles or higher cycles is equal to or less than 0.65. In some variations, the COF of the UV treated PDMS at 3000 cycles or higher cycles is equal to or less than 0.60. In some variations, the COF of the UV treated PDMS at 3000 cycles or higher cycles is equal to or less than 0.55. In some variations, the COF of the UV treated PDMS at 3000 cycles or higher cycles is equal to or less than 0.50.

The modulus, hardness, and/or COF may increase with the thickness of the glass layer of the UV-treated PDMS. However, the thicker the glass layer of the UV-treated PDMS, the more likely the glass layer may crack under extensive stretching, such as 100% stretching. By adding a soft touch coating, the cracking in the glass layer may be reduced. However, the soft touch coating may also cause increase in COF.

Oil diffusion is slowed down or reduced for the UV-treated PDMS compared to untreated PDMS. In some variations, the UV-treated PDMS has an oil diffusion rate less than half of the untreated PDMS. In some variations, the UV-treated PDMS has an oil diffusion rate less than one-third of the untreated PDMS. In some variations, the UV-treated PDMS has an oil diffusion rate less than a quarter of the untreated PDMS.

Small molecules, such as dye, or oil, may diffuse into the PDMS to produce stain. The UV-treated PDMS may have better stain resistance than untreated PDMS. In other words, it may take longer time to stain the UV-treated PDMS than the untreated PDMS.

EXAMPLES

The following examples are for illustration purposes only. It will be apparent to those skilled in the art that many modifications, both to materials and methods, may be practiced without departing from the scope of the disclosure.

Samples

PDMS samples and fluorosilicone samples were prepared by exposing to UV light under various exposure times. In some variations, a UV lamp was used for providing UV light. The UV lamp had a wavelength of 172 nm and a wavelength of 254 nm. It will be appreciated by those skilled in the art that UV lamps with other wavelengths may be used. In some variations, the wavelength may vary from 168 nm to 176 nm. In some variations, the wavelength may also vary from 250 nm to 258 nm.

Table 1 lists the UV exposure time for various samples. For example, sample UV-0.5 min. has an exposure time of 0.5 minutes and a machine cycle of 1 cycle. Sample UV-1 min. has an exposure time of 1.0 minutes and a machine cycle of 2 cycles. Sample UV-2 min. has an exposure time of 2.0 minutes and a machine cycle of 4 cycles. Likewise, sample UV-4 min. has an exposure time of 4.0 minutes and a machine cycle of 8 cycles. When the machine cycle increases by 1, the UV exposure time increases by 0.5 minutes.

TABLE 1

UV exposure time and machine cycles

| Machine cycles | UV exposure time (minutes) | Sample |
| --- | --- | --- |
| 0 | 0 | Untreated |
| 1 | 0.5 | UV-0.5 min. |
| 2 | 1.0 | UV-1 min. |
| 3 | 1.5 | UV-1.5 min. |
| 4 | 2.0 | UV-2 min. |
| 5 | 2.5 | UV-2.5. min |
| 6 | 3.0 | UV-3 min. |
| 7 | 3.5 | UV-3.5 min. |
| 8 | 4.0 | UV-4 min. |

Table 2 lists the samples without and with soft touch coating. Samples S1 and S2 include soft touch coating only and do not have any UV exposure. Samples 51+UV-2 min., S2+UV-4 min. and UV-4 min.+S2 include both soft touch coating and UV exposure.

TABLE 2

Soft touch coating plus UV exposure time for various samples

| Samples | Comments |
| --- | --- |
| S0 | No coating |
| S1 | Softer soft touch coating |
| S2 | Harder soft touch coating than the soft touch coating S1 |
| S1 + UV-2 min. | 2 minutes UV exposure plus soft coating B |
| S1 + UV-4 min. | 4 minutes UV exposure plus soft coating S1 |
| S2 + UV-4 min. | UV exposure 4 minutes plus soft coating S2 (structure in FIG. 3A) |
| UV-4 min. + S2 | UV exposure 4 minutes plus soft coating S2 (structure in FIG. 3B) |

Scanning Electron Microscopy (SEM) Analyses and Results

To characterize the glass coating, the UV treated elastomer samples were cross-sectioned and examined using Scanning Electron Microscopy (SEM) and Energy-Dispersive X-ray Spectroscopy (EDS). SEM images were used to determine thicknesses of the glass coatings formed on the silicones under various exposure times, and various working distances.

Figure 5A:
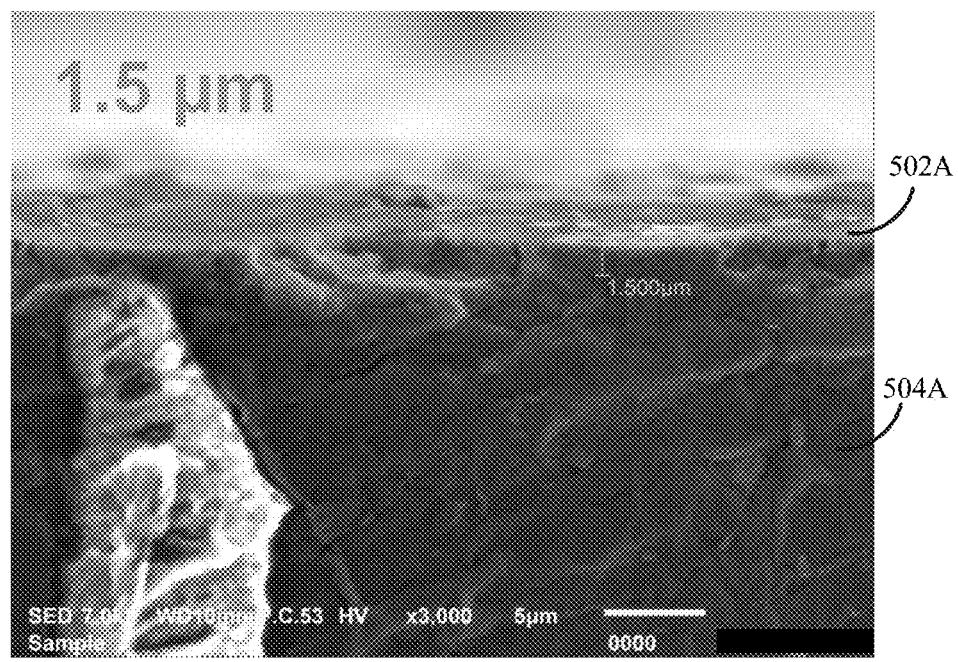
FIG. 5A is a scanning electron microscope (SEM) image of a cross-section of a composite including a glass coating of 1.5 μm thick in accordance with an embodiment of the disclosure.

EDS is an analytical technique used for the elemental analysis or chemical characterization of samples. The EDS analysis was performed on the UV treated samples and untreated samples to determine $O_2$ content. The $O_2$ content increased with UV exposure time due to conversion of methyl group into $SiO_2$ (glass), FIG. 5A is a scanning electron microscope (SEM) image of a cross-section of a composite including a glass coating of 1.5 μm thick in accordance with an embodiment of the disclosure. As shown in FIG. 5A, a thin glass layer 502A was about 1.5 μm formed over a silicone substrate 504A.

Figure 5B:
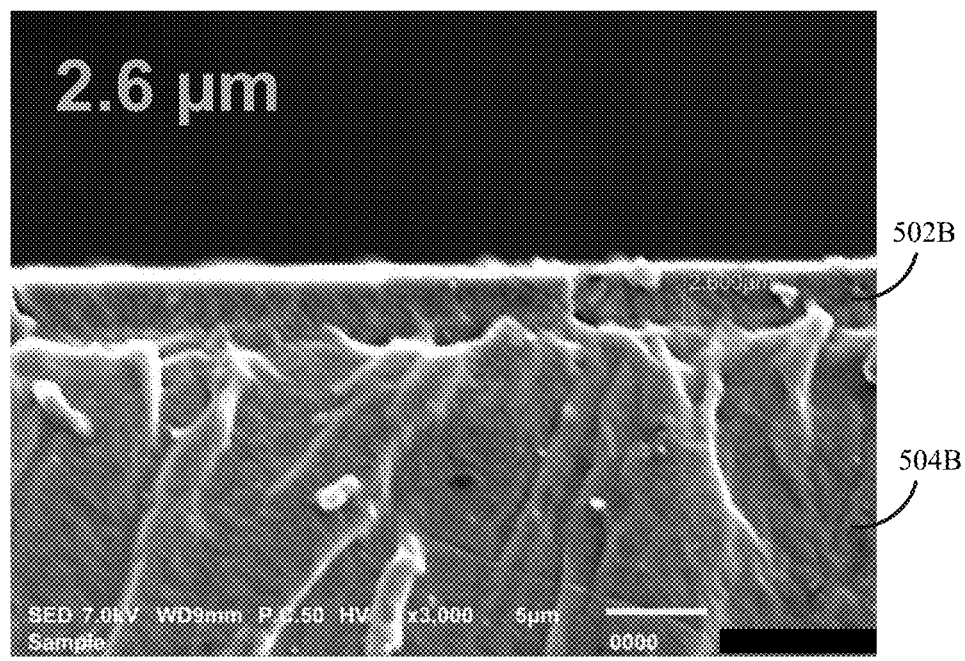
FIG. 5B is a SEM image of a cross-section of a composite including a glass coating of 2.6 μm thick in accordance with an embodiment of the disclosure.

FIG. 5B is a SEM image of a cross-section of a composite including a glass coating of 2.6 μm thick in accordance with an embodiment of the disclosure. As shown in FIG. 5B, a thin glass layer 502B was about 2.6 μm formed over a silicone substrate 504B.

Figure 5C:
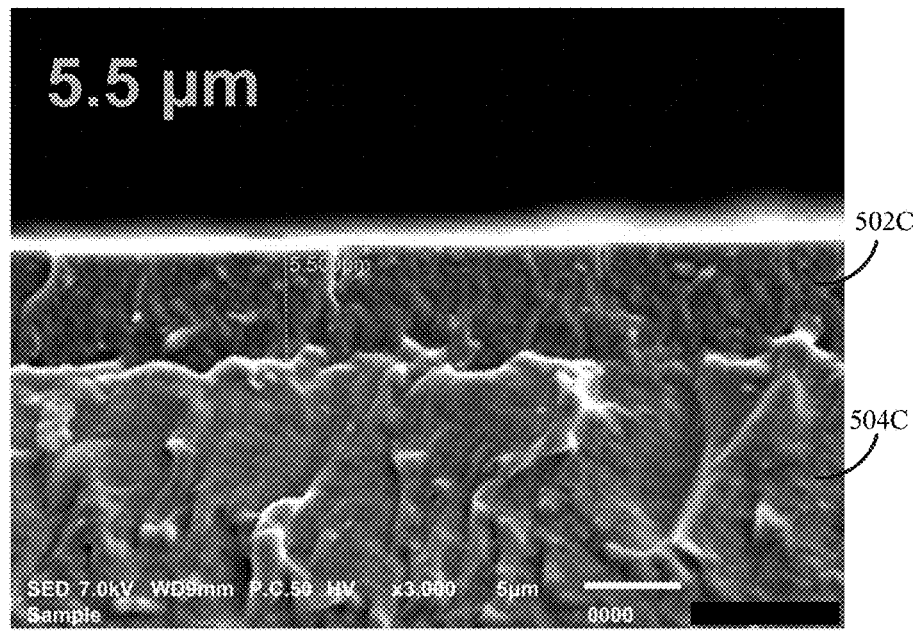
FIG. 5C is a SEM image of a cross-section of a composite including a glass coating of 5.5 μm thick in accordance with an embodiment of the disclosure.

FIG. 5C is a SEM image of a cross-section of a composite including a glass coating of 5.5 μm thick in accordance with an embodiment of the disclosure. As shown in FIG. 5C, a thin glass layer 502C was about 5.5 μm formed over a silicone substrate 504C.

Figure 5D:
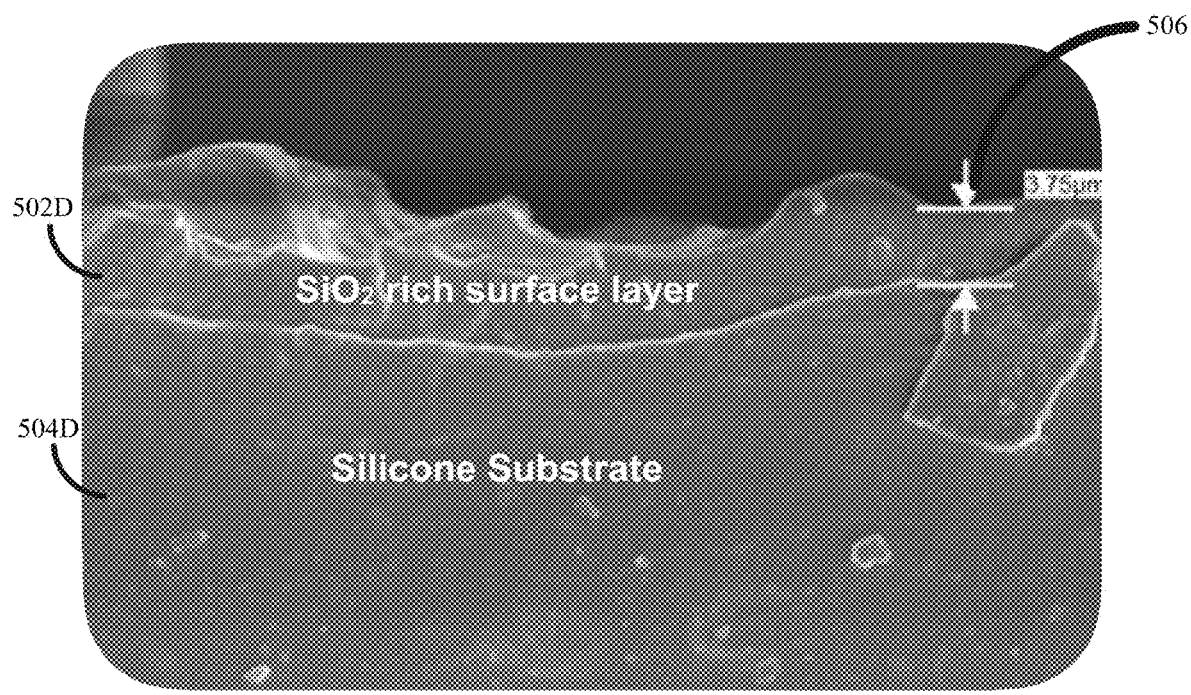
FIG. 5D is a SEM image of a cross-section of a composite including a glass coating of 3.75 μm thick in accordance with an embodiment of the disclosure.

FIG. 5D is a SEM image of a cross-section of a composite in accordance with an embodiment of the disclosure. As shown in FIG. 5D, a thin glass layer 502D was about 3.75 μm thick, as pointed by arrows 506. The glass layer 502D was formed over a silicone substrate 504D. The $SiO_2$ was not as uniform as that shown in FIG. 5B or 5C.

Figure 6:
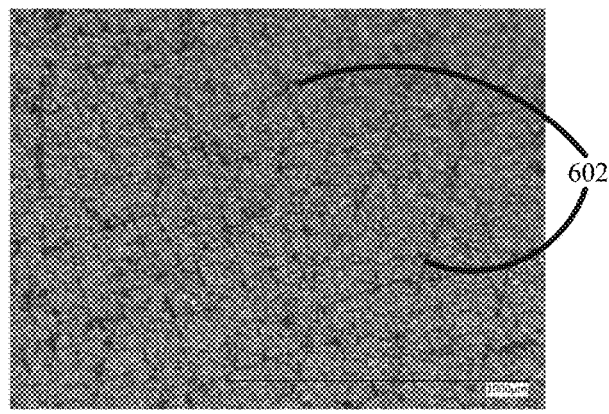
FIG. 6 is a SEM image of a surface of a composite including a glass coating having microcracks in accordance with an embodiment of the disclosure.

FIG. 6 is a SEM image of a surface of a composite including a glass coating with microcracks in accordance with an embodiment of the disclosure. As shown in FIG. 6, microcracks 602 appear on the glass coating formed over the silicone substrate after the composite was stretched to 100%. When the composite goes through extensive stretching, the glass layer of the composite may crack. As such, the soft touch coating may be applied to the glass coating, as shown in FIG. 3.

X-Ray Photoelectron Spectroscopy (XPS) Analyses

Surface analyses using X-ray photoelectron spectroscopy (XPS), also known as electron spectroscopy for chemical analysis (ESCA), were performed on untreated elastomer samples and UV treated elastomer samples, The XPS analysis was used to determine the conversion of Si-CHx to $SiO_2$ in the silicone surface. XPS was used to identify concentration of surface bonded oxygen. As the surface exposure to UV energy/time increases the concentration of hydroxylation of the surface can be measured.

X-ray Photoelectron Spectroscopy (XPS), also known as Electron Spectroscopy for Chemical Analysis (ESCA), is used to determine semi-quantitative atomic composition and chemistry. XPS works by irradiating a sample with monochromatic X-rays, resulting in the emission of photoelectrons whose energies are characteristic of the elements and their chemical/oxidation state, and the intensities of which are reflective of the amount of those elements present within the sampling volume. Photoelectrons are generated within the X-ray penetration depth (typically many microns), but only photoelectrons within the top ~50-100 Å are detected (see Angle Resolved XPS below for more details). Detection limits are approximately 0.05 to 1.0 atomic %. Major factors affecting detection limits are the element itself (heavier elements generally have lower detection limits), interferences (which can include other photoelectron peaks and Auger electron peaks from other elements) and background (mainly caused by signal from electrons that have lost energy to the matrix). XPS does not detect H or He.

Table 3 lists the analytical parameters for XPS.

TABLE 3

| Analytical Parameters | |
|---|---|
| Instrument | PHI Quantum 2000 |
| X-ray source | Monochromated Alk$_\alpha$ 1486.6 eV |

TABLE 3-continued

| Analytical Parameters | |
|---|---|
| Acceptance Angle | ±23° |
| Take-off angle | 45° |
| Analysis area | 1400 μm by 300 μm |
| Charge Correction | C1s 284.8 eV (C—C, C—H) |

Table 4 lists the atomic concentrations of carbon (C), oxygen (O), fluorine (F), and silicon (Si), which were determined based upon XPS/ESCA data. As shown, Samples 1-3 were PDMS, while Sample 4 was fluorosilicone. As shown in Table 3, sample 1 has 37.3 atomic % C, 33.9 atomic % O, 1.5 atomic % F, and 27.3 atomic % Si without UV treatment. In contrast, sample 1 has 18.1 atomic % C, 56.4 atomic % O, and 25.4 atomic % Si with UV treatment of 4 minutes exposure.

Sample 2 has 38.1 atomic % C, 36.8 atomic % O, 1.8 atomic % F, and 23.3 atomic % Si without UV treatment. In contrast, sample 2 has 19.6 atomic % C, 54.1 atomic % O, and 26.2 atomic % Si with UV treatment of 4 minutes exposure.

Sample 3 has 46 atomic % C, 30.3 atomic % O, 0.4 atomic % F, and 23.3 atomic % Si without UV treatment. In contrast, sample 3 has 17.5 atomic % C, 57.1 atomic % O, and 25.4 atomic % Si with UV treatment of 4 minutes exposure.

Sample 4 has 41.1 atomic % C, 14.6 atomic % O, 33.1 atomic % F, and 25.4 atomic % Si without UV treatment. In contrast, sample 4 has 25.4 atomic % C, 41.6 atomic % O, 14.3 atomic % F, and 18.6 atomic % Si with UV treatment of 4 minutes exposure. Sample 4 (fluorosilicone) has significantly higher F atomic concentration than samples 1-3 (PDMS).

TABLE 4

| | | Atomic Concentrations | | | |
|---|---|---|---|---|---|
| | UV Treatment | C (atomic %) | O (atomic %) | F (atomic %) | Si (atomic %) |
| Sample 1 (PDMS) | No | 37.3 | 33.9 | 1.5 | 27.3 |
| | UV-4 min. | 18.1 | 56.4 | n/a | 25.4 |
| Sample 2 (PDMS) | No | 38.1 | 36.8 | 1.8 | 23.3 |
| | UV-4 min. | 19.6 | 54.1 | n/a | 26.2 |
| Sample 3 (PDMS) | No | 46 | 30.3 | 0.4 | 23.3 |
| | UV-4 min. | 17.5 | 57.1 | n/a | 25.4 |
| Sample 4 (Fluorosilicone) | No | 41.1 | 14.6 | 33.1 | 11.2 |
| | UV-4 min. | 25.5 | 41.6 | 14.3 | 18.6 |

Table 5 lists the Si-CHx to Si-Ox conversion based upon the atomic concentrations in Table 4. As shown, Samples 1-3 were PDMS, while Sample 4 was fluorosilicone. The conversion is determined by Equation (1) as follows:

$$\text{Atomic Concentration } (AC) = \frac{(Si-CH)_x}{[(Si-CH)_x + (Si-O)_x]} \quad \text{Equation (1)}$$

Percent Conversion (%) = $\Delta AC/AC_o \times 100$ $AC_o$ = Atomic Concentration before $UV$ energy $AC_a$ = Atomic Concentration after $UV$ energy $\Delta AC = AC_o - AC_a$ ·Normalized to 100% of the elements -continued detected. *XPS* does not detect *H* or *He*

·Values are percentages of the total atomic concentration of the corresponding elements detected (*C, OF, Si*).

Sample 1 had 76 atomic % Si-CHx and 24 atomic % Si-Ox without UV treatment. In contrast, Sample 1 had 29 atomic % Si-CHx and 71 atomic % Si-Ox with UV treatment of 8 cycles or exposure time of 4 minutes. Si-CHx was reduced from 76 atomic % to 29 atomic %, while Si-Ox was increased from 24 atomic % to 71 atomic %, which resulted in a conversion of 61.8%.

Sample 2 had 67 atomic % Si-CHx and 33 atomic % Si-Ox without UV treatment. In contrast, Sample 2 had 25 atomic % Si-CHx and 75 atomic % Si-Ox with UV treatment of 8 cycles or exposure time of 4 minutes. Si-CHx was reduced from 67 atomic % to 25 atomic %, while Si-Ox was increased from 33 atomic % to 75 atomic %, which resulted in a conversion of 62.6%.

Sample 3 had 95 atomic % Si-CHx and 5 atomic % Si-Ox without UV treatment. In contrast, Sample 3 had 29 atomic % Si-CHx and 71 atomic % Si-Ox with UV treatment of 8 cycles or exposure time of 4 minutes. Si-CHx was reduced from 95 atomic % to 29 atomic %, while Si-Ox was increased from 5 atomic % to 71 atomic %, which resulted in a conversion of 69.5%.

Sample 4 had 84 atomic % Si-CHx and 16 atomic % Si-Ox without UV treatment. In contrast, Sample 4 had 36 atomic % Si-CHx and 64 atomic % Si-Ox with UV treatment of 8 cycles or exposure time of 4 minutes. Si-CHx was reduced from 84 atomic % to 36 atomic %, while Si-Ox was increased from 16 atomic % to 64 atomic %, which resulted in a conversion of 57.1%, which was the lowest among all samples.

Note that sample 4 (fluorosilicone) had a lower conversion % than samples 1-3 (PDMS). This suggests that ozone may diffuse into fluorosilicone less than silicone. The conversion of Si-CHx to SiOx under the same UV exposure was more effective for silicone than fluorosilicone.

In some variations, the conversion of a surface portion of the elastomer into a $SiO_2$ layer is at least 60%. In some variations, the conversion of a surface portion of the elastomer into a $SiO_2$ layer is at least 65%. In some variations, the conversion of a surface portion of the elastomer into a $SiO_2$ layer is at least 70%.

TABLE 5

Conversion of Si-CHx to $SiO_2$ for Samples 1-4 under UV treatment

| | UV Treatment | Si-CHx | Si-Ox | % Conversion |
|---|---|---|---|---|
| Sample 1 (PDMS) | No | 76 | 24 | 61.8 |
| | UV-exposure 4 minutes | 29 | 71 | |
| Sample 2 (PDMS) | No | 67 | 33 | 62.6 |
| | UV- exposure 4 minutes | 25 | 75 | |
| Sample 3 (PDMS) | No | 95 | 5 | 69.5 |
| | UV- exposure 4 minutes | 29 | 71 | |
| Sample 4 (Fluorosilicone) | No | 84 | 16 | 57.1 |
| | UV- exposure 4 minutes | 36 | 64 | |

Figure 7:
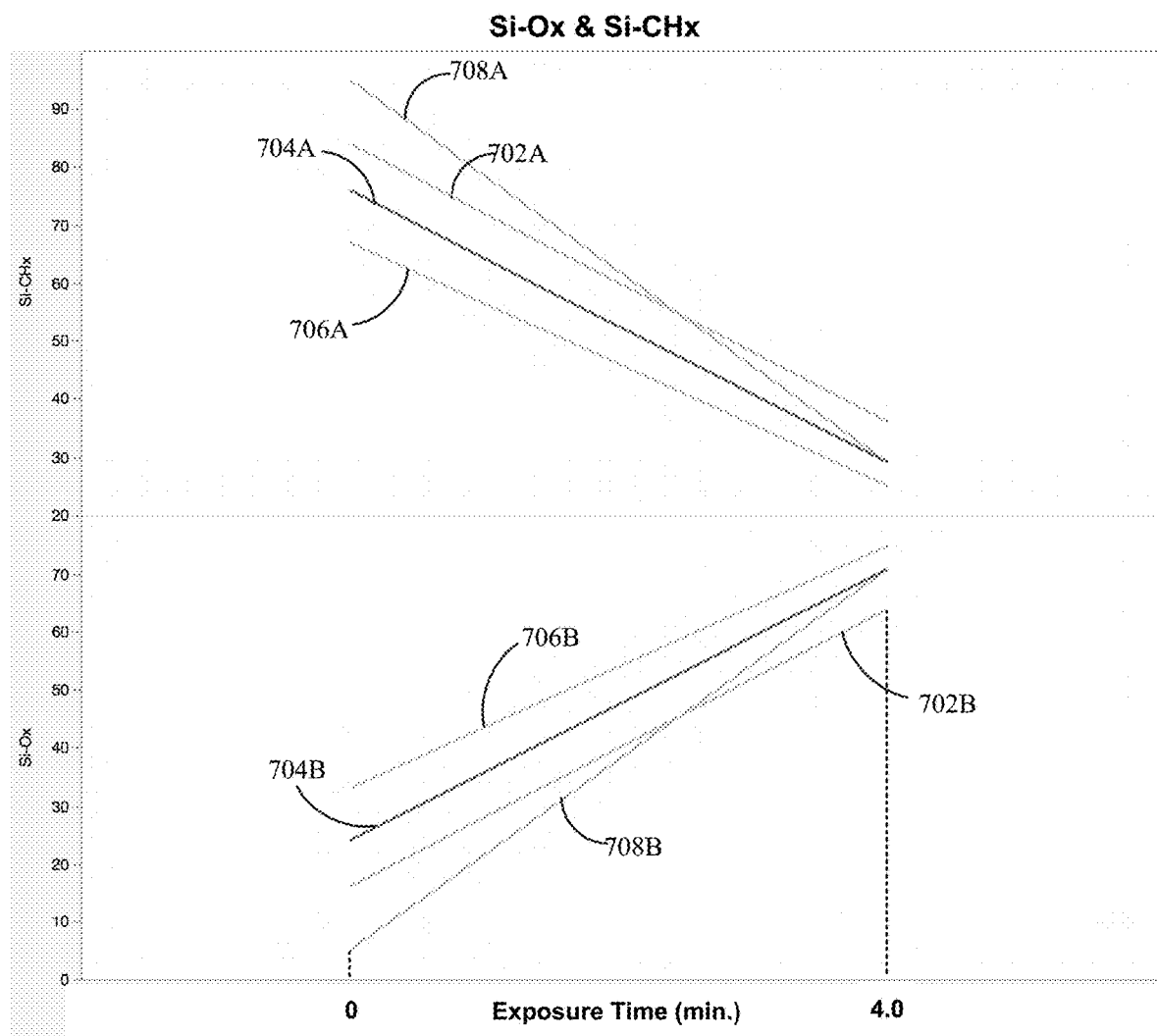
FIG. 7 illustrates the Si-Ox and Si-CHx versus UV treatments to silicone in accordance with an embodiment of the disclosure.

FIG. 7 illustrates the Si-Ox and Si-CHx versus UV treatments of silicone in accordance with an embodiment of the disclosure. As shown, labels 702A, 704A, 706A, and 708A represent Si-CHx for samples 1, 2, 3, 4, respectively. Labels 702B, 704B, 706B, and 708B represent Si-Ox for samples 1, 2, 3, 4, respectively. Si-CHx for each of samples 1-4 decreases with increased UV exposure time to 4 minutes, while Si-Ox for each of samples 1-4 increases with UV exposure time to 4 minutes. As shown, sample 4 had the slopes less steeper than samples 1-3 in both Si-CHx and Si-Ox.

Effect of Working Distance on $SiO_2$ Thickness

Figure 8:
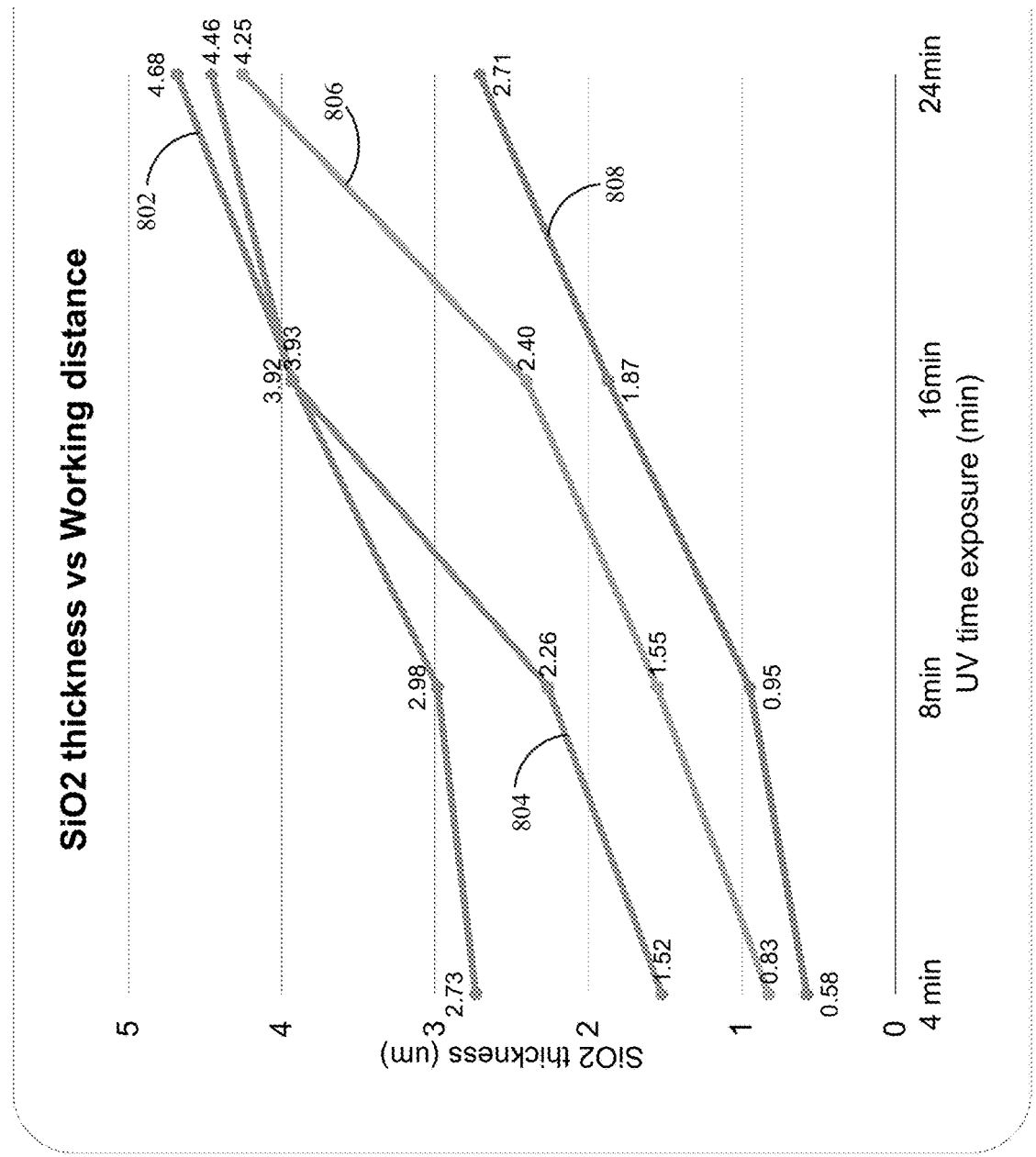
FIG. 8 illustrates $SiO_2$ thicknesses versus UV exposure times under various working distances in accordance with an embodiment of the disclosure.

Working distance plays an important role in formation of a $SiO_2$ layer. FIG. 8 illustrates $SiO_2$ thicknesses versus UV exposure times under various working distances in accordance with an embodiment of the disclosure. In FIG. 8, curves 802, 804, 806, and 808 represent working distances of 1 mm, 3 mm, 5 mm, and 7 mm, respectively.

As shown, the $SiO_2$ thicknesses increase with the exposure time at all the working distances. Specifically, at a working distance of 1 mm, the $SiO_2$ thickness started at 2.73 μm at an exposure time of 4 minutes and increased to 4.68 μm at an exposure time of 24 minutes. Turn to curve 804 now, at a working distance of 3 mm, the $SiO_2$ thickness started at 1.52 μm at an exposure time of 4 minutes and increased to 4.46 μm at an exposure time of 24 minutes.

Turn to curve 806 now, at a working distance of 5 mm, the $SiO_2$ thickness started at 0.83 μm at an exposure time of 4 minutes and increased to 4.25 μm at an exposure time of 24 minutes.

Turn to curve 804 now, at a working distance of 7 mm, the $SiO_2$ thickness started at 0.58 μm at an exposure time of 4 minutes and increased to 2.71 μm at an exposure time of 24 minutes.

At a fixed exposure time of 4 minutes, the $SiO_2$ thickness decreased when the working distance increased. For example, the $SiO_2$ thickness was 0.58 μm at a working distance of 7 mm, increased to 0.83 μm at a working distance of 5 mm, and increased to 1.52 μm at a working distance of 3 mm and further increased to 2.73 μm at a working distance of 1 mm. At a fixed exposure time of 24 minutes, the $SiO_2$ thickness decreased when the working distance increased. For example, the $SiO_2$ thickness was 2.71 μm at a working distance of 7 mm, increased to 4.25 μm at a working distance of 5 mm, and increased to 4.46 μm at a working distance of 3 mm and further increased to 4.68 μm at a working distance of 1 mm. At a working distance of 7 mm, the $SiO_2$ thickness could not reach to the thickness achieved at a working distance ranging from 1 mm to 5 mm. As such, the working distance may be less than 7 mm for effective conversion of elastomer into $SiO_2$ under the UV exposure.

In some variations, the working distance may vary from 1 mm to 6 mm.

Modulus Versus Hardness

Figure 9:
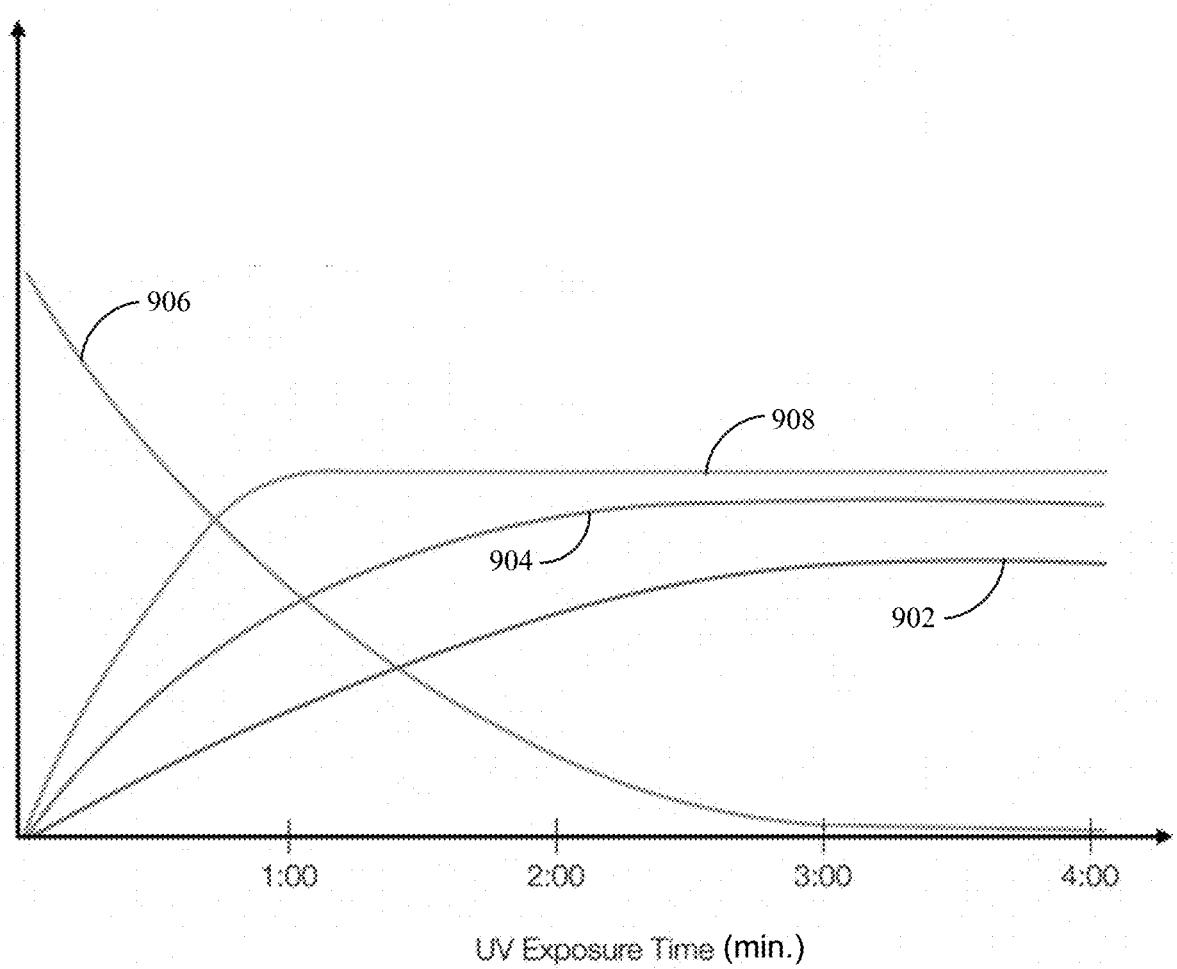
FIG. 9 illustrates correlations of nano hardness, coefficient of friction (COF), $SiO_2$ thickness, and $O_2$ content versus UV exposure times of silicone in accordance with an embodiment of the disclosure.

Effective modulus is determined at about 2 μm depth below the surface. The thickness of the $SiO_2$ layer and hardness of the surface increase with longer UV exposure time. FIG. 9 illustrates correlations of nano hardness, COF, $SiO_2$ thickness, and $O_2$ content versus UV exposure times of silicone in accordance with an embodiment of the disclosure. Curves 902, 904, 906, and 908 represent nano hardness, coefficient of friction (COF), conversion thickness and $O_2$ content obtained in EDS, respectively. As shown in FIG. 9, the nano hardness, conversion thickness and $O_2$ content increase with UV exposure time and reach a saturated level after a period of time. The nano hardness, conversion thickness and $O_2$ content would not continue to increase with extended exposure time The COF decreases with exposure time to nearly zero with increased UV exposure time.

Figure 10:
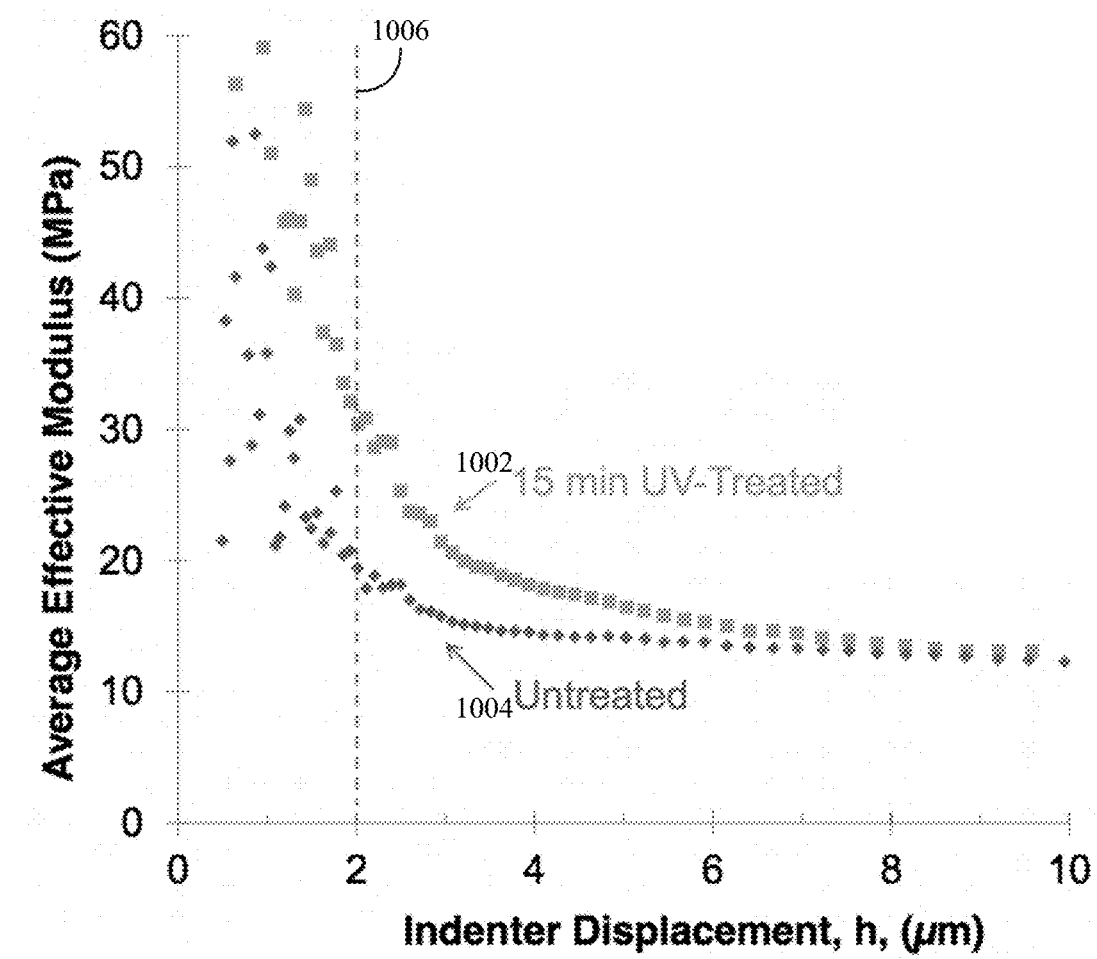
FIG. 10 illustrates average effective moduli versus indenter displacements of silicone in accordance with an embodiment of the disclosure.

FIG. 10 illustrates average effective moduli versus indenter displacements in accordance with an embodiment of the disclosure. As shown, curve 1002 represents PDMS samples with 15 minute UV treatment, while curve 1004 represents untreated PDMS samples, which have a lower average effective modulus than the UV treated samples. As shown, a near-surface region is to the left side of vertical line 1006 and within 2 μm indenter displacement. A bulk region is to the right of vertical line 1006. The near-surface region of the 15 minute UV-treated silicone is significantly stiffer than that of the untreated band. For example, the untreated PDMS sample had an effective modulus of 19.4±3.4 MPa at 2 μm depth below the surface. In contrast, the 15 minute UV-treated PDMS had an effective modulus of 30.4±8.3 MPa at 2 μm depth below the surface. The near-surface is considered to be at about 2 to 4 μm depth below the surface. The bulk region is considered as below the converted layers of the surface, usually greater than 10 μm. Both of the UV treated PDMS sample and the untreated PDMS sample show comparable average effective modulus in the bulk.

Fourier-Transform Infrared Spectroscopy (FTIR) Analysis

Reduction in oil diffusion was found with the elastomer surface conversion into a glass coating. Oil diffusion can be evaluated by FTIR, which is an analytical technique that can obtain an infrared spectrum of absorption or emission of a polymer, chemical, organic compounds, or organic materials. The FIR can collect high resolution spectra over a wide spectral range.

Experiments were performed to evaluate oil diffusion by the FTIR. A FTIR crystal was placed on an opposite side of the silicone sample to the oil. When the FTIR crystal detected the oil, which indicated that the oil diffused through the silicone sample.

The samples were weighted before and after oil diffusion to determine the change in weight. The samples were also evaluated for swelling.

Table 6 lists the time for showing discoloration and observation of swelling and % change in weight for various samples. As shown, the untreated sample swelled and showed discoloration after 10 minutes, and had 5% change in weight. Sample 51 swelled and showed discoloration after 5 minutes, which was the least amount of time among all the samples. Sample 51 had 5% change in weight. Sample S2+UV-2 min. swelled and showed discoloration after 30 minutes, and had 5% change in weight. Sample UV-4 min. did not swell and showed discoloration after 30 minutes, and had 3% change in weight. Sample UV-2 min.+S2 did not swell and showed discoloration after 1 hour, which was the longest time among all the samples. Sample UV-2 min.+S2 also had 1% change in weight, which was the least among all the samples. Sample UV-2 min.+S2 seemed to have the highest oil resistance among all the samples.

Construction of the stack of polymer coating and glass coating layer is flipped to have the glass layer over the polymer coating, as shown in FIG. 3B, such that UV energy is applied to the coating layer, which underperformed compared to the construction shown in FIG. 3A with the polymer coating over the glass coating.

TABLE 6

| Oil Resistance | | | |
| --- | --- | --- | --- |
| Sample | % Change in Weight | Swelling | Discoloration |
| Untreated | 5 | Yes | 10 minutes |
| UV | 3 | No | 30 minutes |

TABLE 6-continued

| Oil Resistance | | | |
| --- | --- | --- | --- |
| Sample | % Change in Weight | Swelling | Discoloration |
| exposure 4 minutes | | | |
| Soft coating S1 | 5 | Yes | 5 minutes |
| UV exposure 2 minutes plus soft coating S2 | 1 | No | 1 hour |
| Soft coating S2 plus UV exposure 2 minutes | 5 | Yes | 30 minutes |

Figure 11:
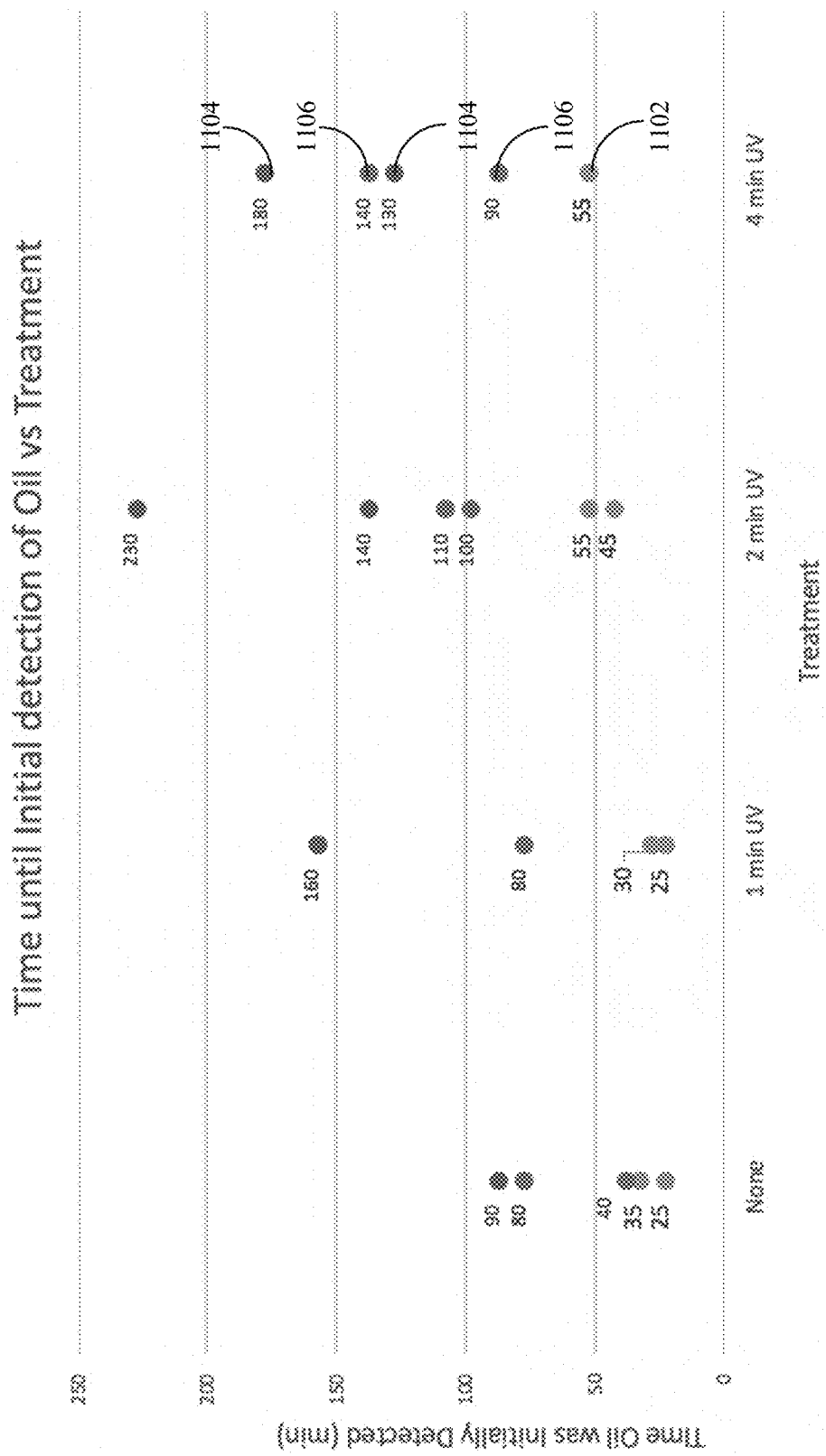
FIG. 11 illustrates times until initial oil detection versus UV exposure times of silicone in accordance with an embodiment of the disclosure.

FIG. 11 illustrates times until initial oil detection versus UV exposure times of silicone in accordance with an embodiment of the disclosure. Samples 1-3 (PDMS) were listed in Table 4. Label 1102 represents Sample 3, label 1104 represents Sample 2, and label 1106 represents Sample 1.

Without any UV exposure, Sample 1 (1106) had an initial time of 40 minutes and 80 minutes for oil detection. Sample 2 (1104) had an initial time of 90 minutes for oil detection. Sample 3 (1102) had an initial time of 25 minutes and 35 minutes for oil detection.

At the UV exposure time of 1 minutes, Sample 1 (1106) had an initial time of 80 minutes for oil detection. Sample 2 (1104) had an initial time of 160 minutes for oil detection. Sample 3 (1102) had an initial time of 25 minutes and 30 minutes for oil detection.

At the UV exposure time of 2 minutes, Sample 1 (1106) had an initial time of 100 minutes and 110 minutes for oil detection. Sample 2 (1104) had an initial time of 140 minutes and 230 minutes for oil detection. Sample 3 (1102) had an initial time of 45 minutes and 55 minutes for oil detection.

At the UV exposure time of 4 minutes, Sample 1 (1106) had an initial time of 55 minutes for oil detection. Sample 2 (1104) had an initial time of 130 minutes and 180 minutes for oil detection. Sample 3 (1102) had an initial time of 90 minutes and 140 minutes for oil detection.

UV treatment to silicone slowed the process of oil absorption compared to untreated silicone. Compared to untreated samples, the initial times for oil detection were shorter than the UV treated samples. The UV treated samples generally had longer initial times than the untreated samples.

Resistance to oil absorption or oil diffusion did not correlate with thickness of $SiO_2$ layer or oxidation layer. As shown in FIG. 11, the initial time for oil detection did not correlate with UV exposure time for each of Samples 1-3 (PDMS).

Coefficient of Friction (COF)

The COF of the composite including a layer of glass over an elastomer changes with oil diffusion. Experiments were performed by using Kyowa TSf-503 to determine COF for various UV treated and untreated samples. The Kyowa TSf-503 is designed for computer-controlled analysis of the static and kinetic coefficient of friction (COF). The system includes a linear reciprocating sample stage.

For the COF measurements, a frictional weight of 250 g was used. A frictional measurement count was one time including four measurements from the machine at three locations. A sliding distance was 20 mm. A testing speed was 10 mm/s. The procedure included: (a) check and adjust a balance level, and set a tolerance droplet in a middle; (b)

place a band sample flat, align the middle of the band sample with a measurement handle; (c) tighten the band sample to make sure the band sample was not moving freely and a metal probe was gently touching the band sample surface; (d) click "start measuring" from software. Press "yes" after confirming a measurement condition set in the measurement window and setting in a main body; (e) record both static (US) and kinetic (UK) coefficients and standard deviations at top and bottom locations of the band sample.

Figure 12A:
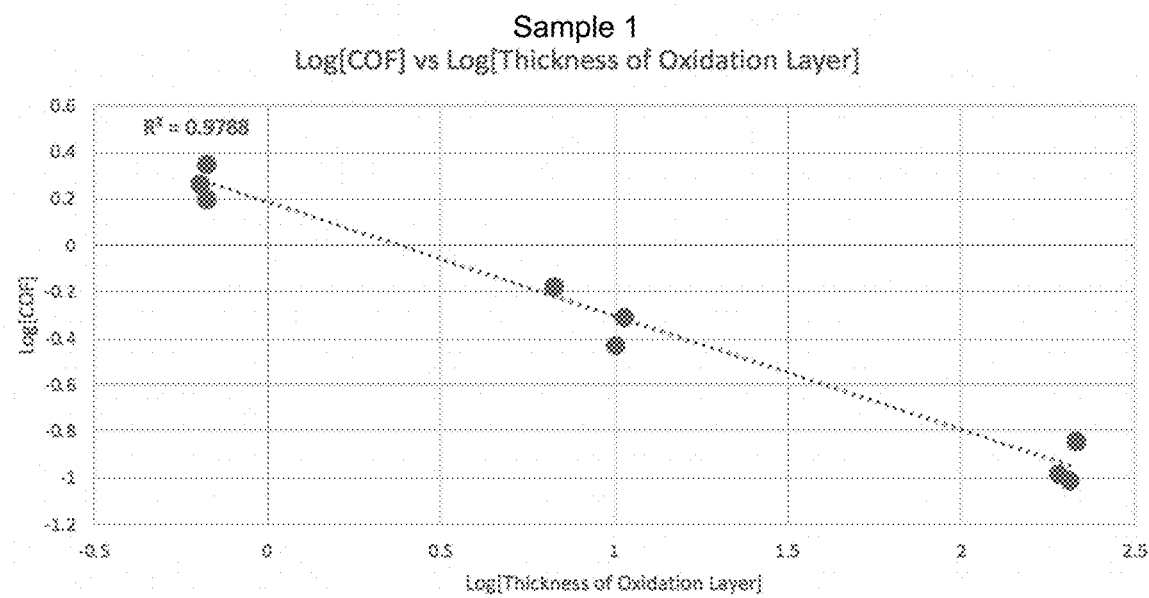
FIG. 12A illustrates Log(COF) versus Log(thickness of oxidation layer) for Sample 1 in accordance with an embodiment of the disclosure.

FIG. 12A illustrates Log(COF) versus Log(thickness of oxidation layer) for Sample 1 (PDMS) in accordance with an embodiment of the disclosure. As shown in FIG. 12A, there was a strong negative linear correlation between the log of the thickness of $SiO_2$ layer and the log of COF.

Figure 12B:
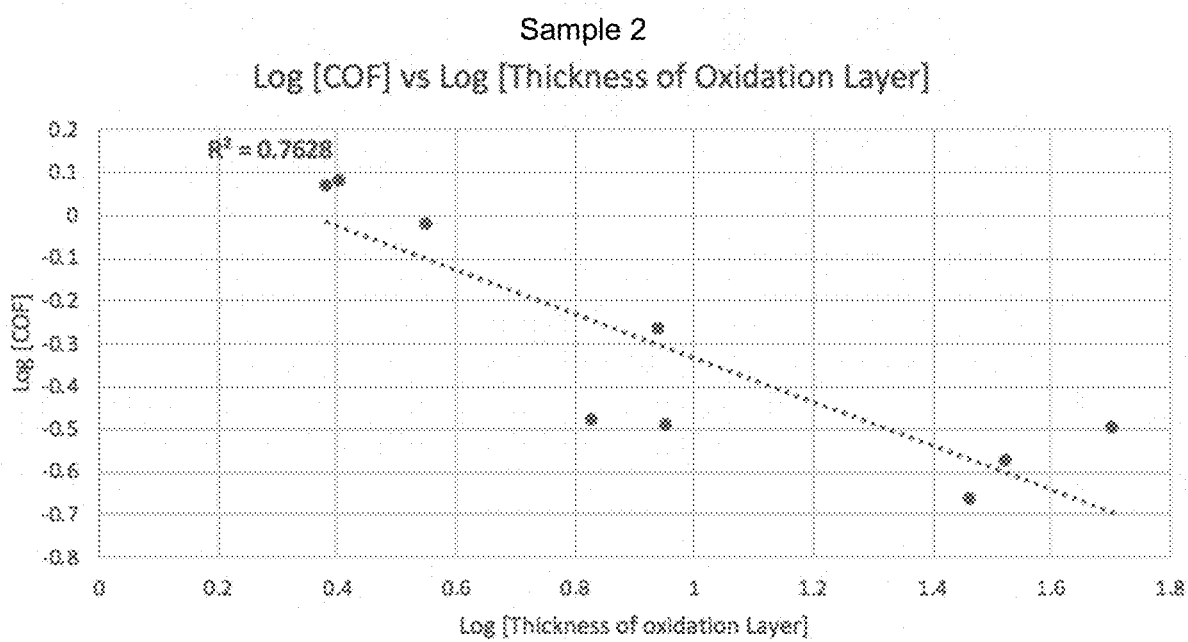
FIG. 12B illustrates Log(COF) versus Log(thickness of oxidation layer) for Sample 2 in accordance with an embodiment of the disclosure.

FIG. 12B illustrates Log(COF) versus Log(thickness of oxidation layer) for Sample 2 (PDMS) in accordance with an embodiment of the disclosure. As shown in FIG. 12A, there was also a negative linear correlation between the log of the thickness of $SiO_2$ layer and the log of COF.

Figure 12C:
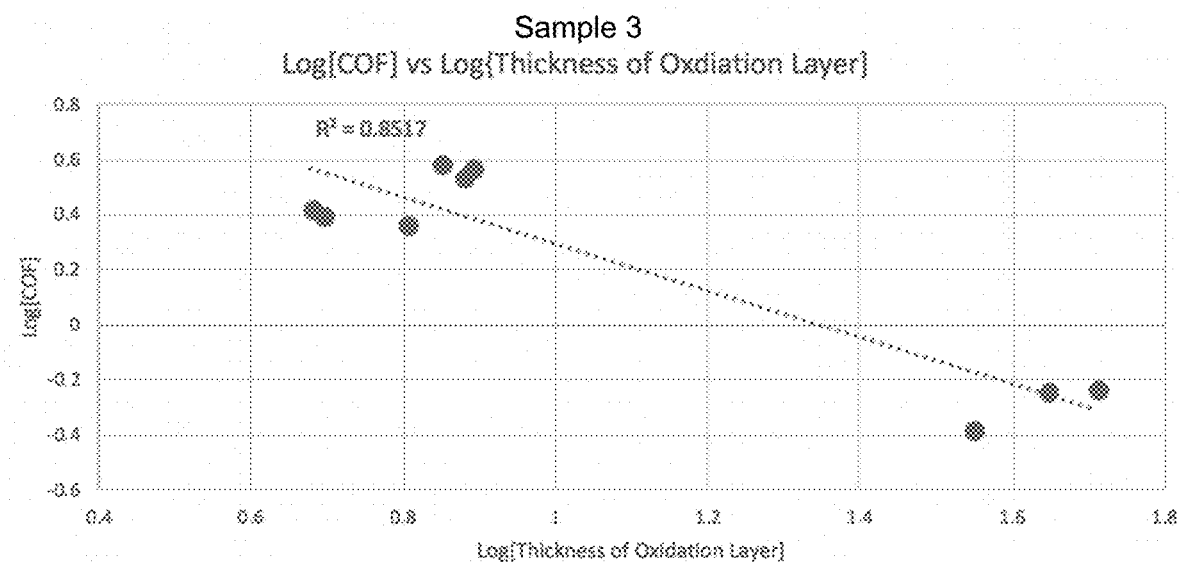
FIG. 12C illustrates Log(COF) versus Log(thickness of oxidation layer) for Sample 3 in accordance with an embodiment of the disclosure.

FIG. 12C illustrates Log(COF) versus Log(thickness of oxidation layer) for Sample 3 (PDMS) in accordance with an embodiment of the disclosure. As shown in FIG. 12B, there was also a negative linear correlation between the log of the thickness of $SiO_2$ layer and the log of COF.

Figure 13:
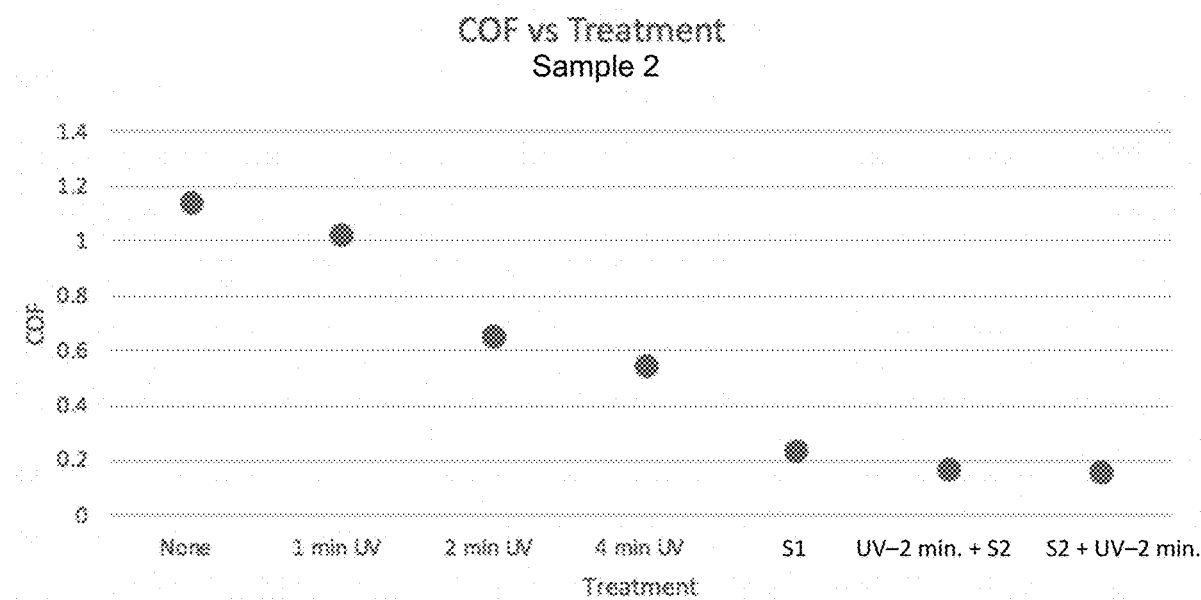
FIG. 13 illustrates COFs versus UV exposure times for Sample 2 in accordance with an embodiment of the disclosure.

FIG. 13 illustrates COFs versus UV exposure times for Sample 2 (PDMS) in accordance with an embodiment of the disclosure. As shown in FIG. 13, when UV exposure time increased, the COF decreased, which revealed a weak negative linear relationship. For example, the COF was about 1.18 for the elastomer without UV treatment. The COF was reduced to about 1.02 for the elastomer with UV treatment of 1 minute. The COF was further reduced to about 0.62 for the elastomer with UV treatment of 2 minutes. The COF was further reduced to about 0.58 for the elastomer with UV treatment of 4 minutes.

The COF was reduced to about 0.22 for the elastomer without UV treatment but with a soft touch coating (S1). The soft touch coating has a lower COF than UV treated elastomers.

The COF was further reduced to about 0.19 for the elastomer with UV treatment of 2 minutes (UV-2 min.+S2) and a soft touch coating. The COF was also reduced to about 0.19 for the elastomer with UV treatment of 2 minutes (S2+UV-2 min.). The UV treatment slightly reduced the COF compared to the soft touch coated elastomer without UV treatment.

Coating Adhesion and Wear Tests

It was difficult to evaluate the coating adhesion by peel tests commonly used for determination of coating adhesion, because the glass layer and the soft touch coating were both very thin. Instead, wear tests were performed on various samples, including UV treated elastomer samples at various exposure times, UV treated samples with soft touch coatings, untreated elastomer samples, and elastomer samples with soft touch coatings but without UV treatment.

The wear test was a customized test in which slide testing of the product geometry is at a set speed and force against unique surfaces, including itself.

After the wear cycles, kinetic COFs were determined for various samples. UV-treated samples showed lower COF at both TO and after 1000 cycles of abrasion. The UV-treated samples with and without soft touch coating both showed much slower increase in COF. The soft touch coating helps improvement of wear resistance of the UV-treated silicone samples.

Figure 14:
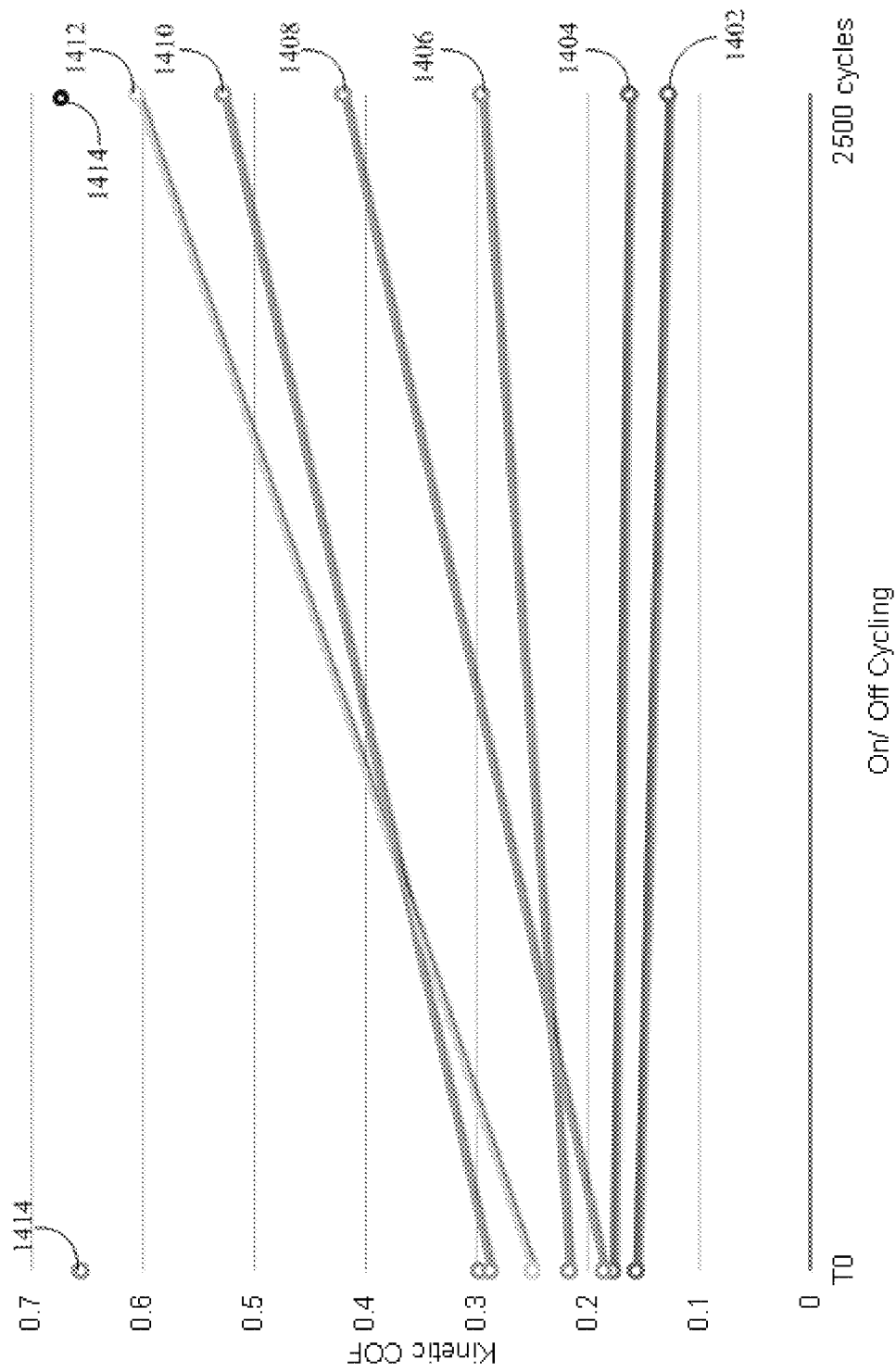
FIG. 14 illustrates kinetic COFs versus on/off cycles in accordance with an embodiment of the disclosure.

FIG. 14 illustrates kinetic COFs versus on/off cycles in accordance with an embodiment of the disclosure. As shown, line 1402 represents for sample UV-4 mins., which had an initial COF of 0.15 at TO (i.e. zero cycle). The initial COF slightly reduced to a COF of about 0.13 at 2500 cycles, which the lowest COF among all the samples.

Line 1404 represents for sample UVB, which had an initial COF of 0.18 at TO. The initial COF slightly decreased to a COF of about 0.17 at 2500 cycles, which was the second lowest COF among all samples.

Line 1406 represents for sample S2, which had an initial COF of 0.22 at TO. The initial COF increased to a COF of about 0.3 at 2500 cycles, which was higher than UV treated samples (UV-4 min. and UV-2 min.), but lower than UV treated samples with soft touch coatings, such as UV-4 min.+S1 and UV-2 min.+S1. Line 1408 represents for sample UV-4 min.+S1, which had an initial COF of 0.19 at TO that increased to a COF of about 0.42 at 2500 cycles. Line 1410 represents for sample UV-2 min.+S1, which had an initial COF of 0.28 at TO. The initial COF increased to a COF of about 0.53 at 2500 cycles. Line 1412 represents for sample S1, which had an initial COF of 0.25 at TO. The initial COF increased to a COF of about 0.60 at 2500 cycles, which was higher than 0.3 at 2500 cycles for sample S2. Label 1414 represents sample without coating or UV treatment, which had an initial COF of 0.65 at TO. The initial COF slightly increased to a COF of about 0.67 at 2500 cycles, which was the highest among all samples.

Figure 15:
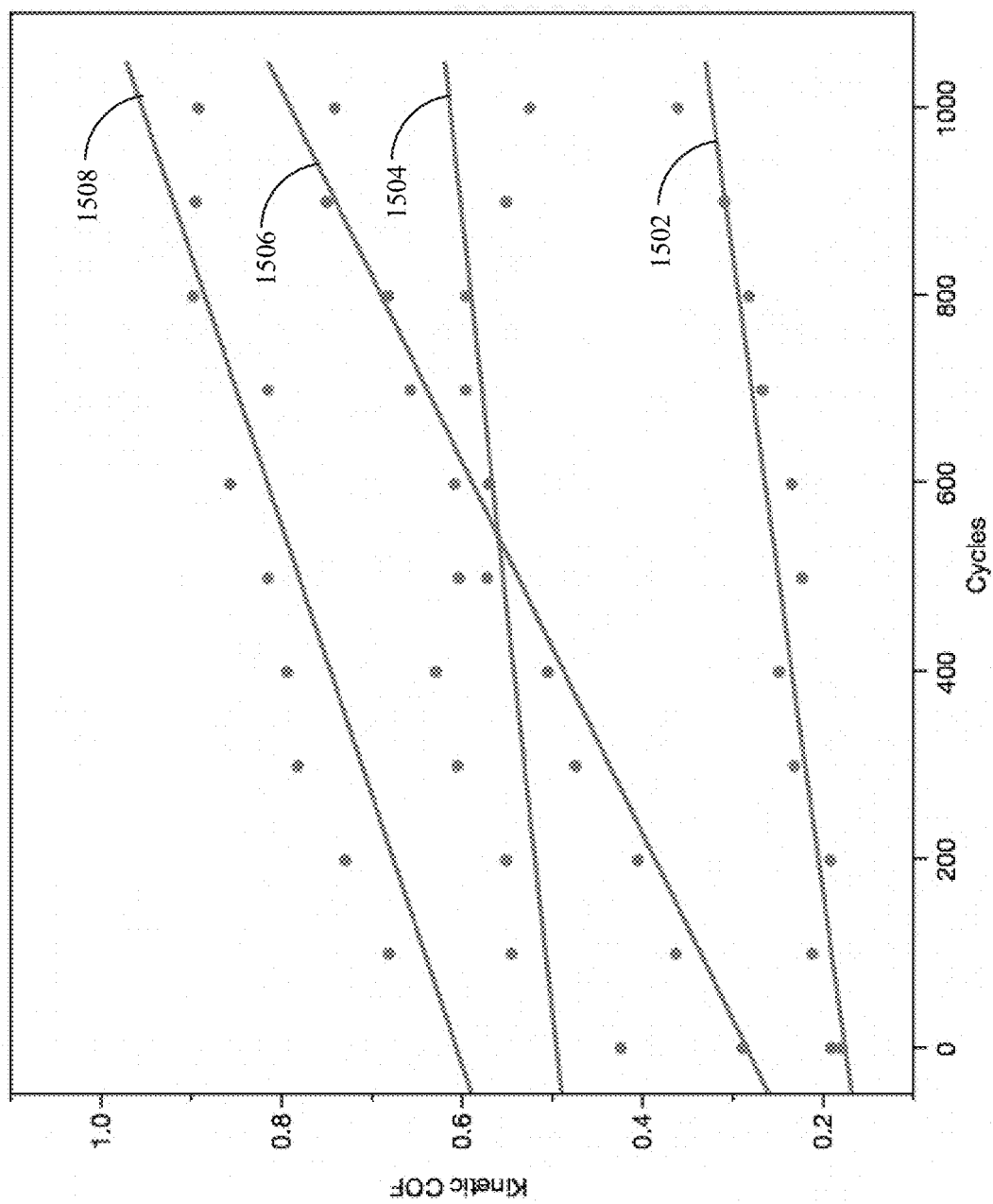
FIG. 15 illustrates kinetic COFs versus numbers of cycles in accordance with an embodiment of the disclosure.

FIG. 15 illustrates kinetic COFs versus number of cycles in accordance with an embodiment of the disclosure. As shown in FIG. 15, kinetic COF increased with the number of cycles for various samples. Labels 1502, 1504, 1506, and 1508 represent samples UV-2 min., UV-2 min.+S1, S2, and S1, respectively. The UV treated sample (UV-2 min.) without soft touch coating revealed slower increase in kinetic COF than all the other samples with soft touch coating only or UV treated with soft touch coating.

Figure 16:
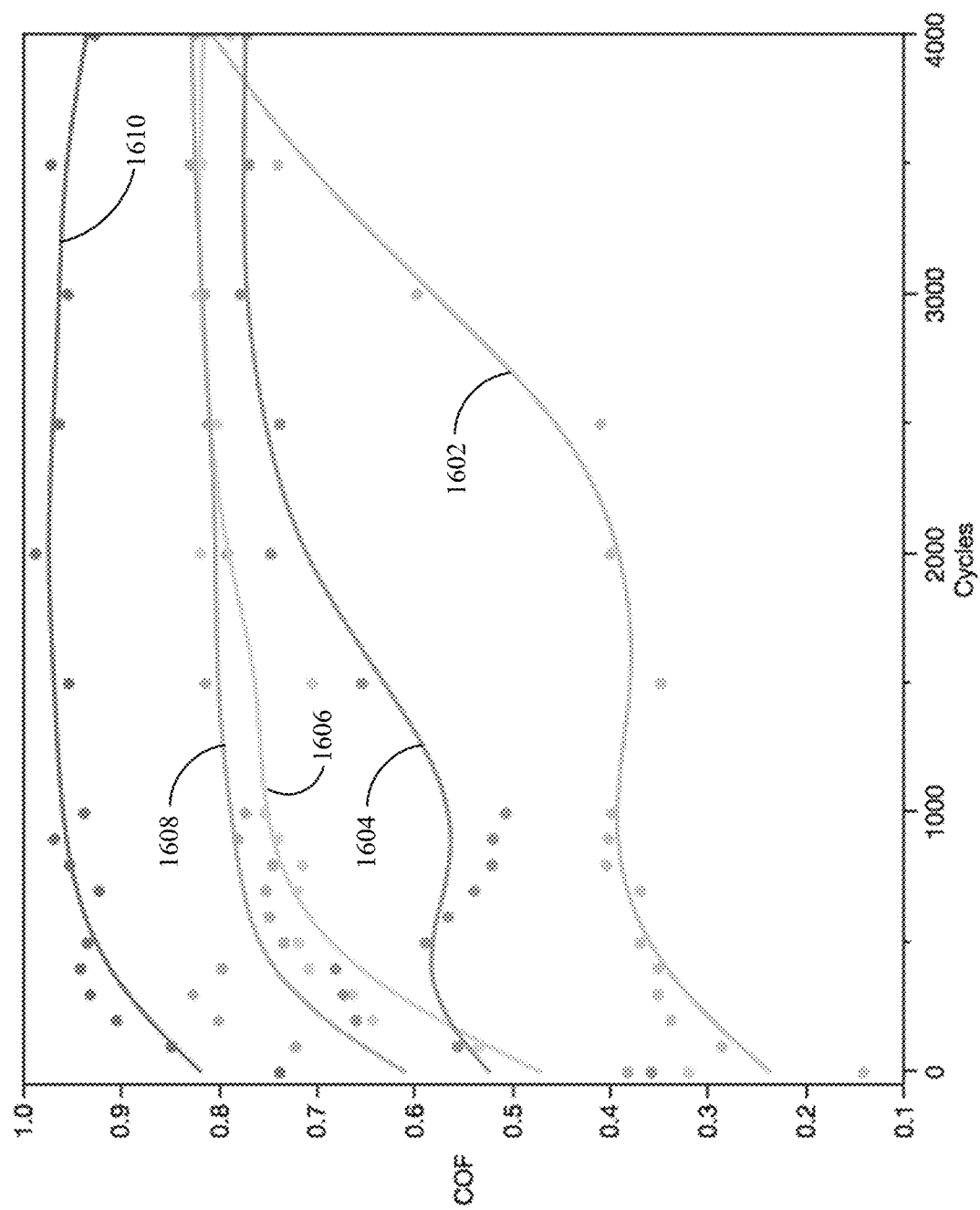
FIG. 16 illustrates COFs versus numbers of cycles in accordance with an embodiment of the disclosure.

Longer exposure time and harder soft touch coating (S2 better than S1) seem to provide better wear resistance up to 4000 cycles. FIG. 16 illustrates kinetic COF versus number of cycles in accordance with an embodiment of the disclosure. As shown in FIG. 16, COF increased with the number of cycles for various samples. Labels 1602, 1604, 1606, 1608, and 1610 represent samples UV-2 min.+S2, UV-2 min.+S1, UV-1 min+S1, UV-1.5 min.+S1, and uncoated (i.e. no UV and no soft touch coating), respectively. The UV treated sample (UV-2 min.) without soft touch coating revealed slower increase in COF than all the other samples with soft touch coating only or UV treated with soft touch coating. As shown in FIG. 16, sample UV-2 min.+S2 with the longest exposure time revealed the lowest COF among all samples. Sample UV-2 min.+S1 had higher COF than sample UV-2 min.+S2 with the same UV exposure time, but different soft touch coating. Sample UV-1.5 min.+S1 had slightly higher initial COF than sample UV-1 min.+S1 up to about 2000 cycles, and then reached the same COF as sample UV-1 min.+S1 after 2000 cycles. Sample UV-2 min.+S1 had lower COF than sample UV-1.5 min.+S1 and UV-1 min.+S1 after 200 cycles till 4000 cycles.

Figure 17:
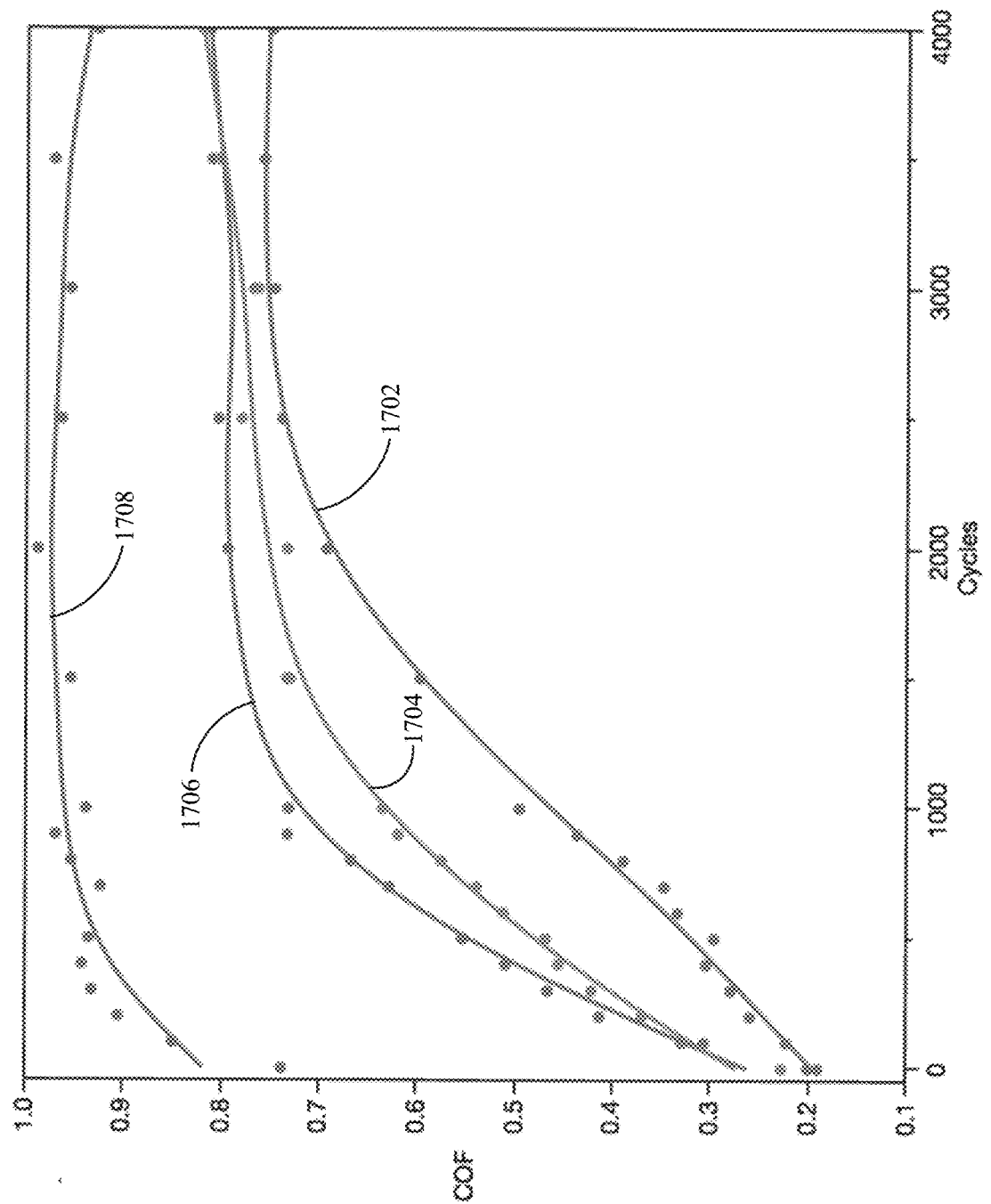
FIG. 17 illustrates COFs versus numbers of cycles in accordance with an embodiment of the disclosure.

Longer exposure time seems to provide better wear resistance up to 4000 cycles. However, without the soft touch coating, the kinetic COF as shown in FIG. 17 is higher than the COF for samples with the soft touch coating and the same UV exposure time. FIG. 17 illustrates kinetic COF versus number of cycles in accordance with an embodiment of the disclosure. As shown in FIG. 17, COF increased with the number of cycles for various samples. Labels 1702, 1704, 1706, and 1708 represent samples UV-2 min., UV-1.5 min., UV-1 min., and uncoated (i.e. no UV and no soft touch coating), respectively. The UV treated sample (UV-2 min.) revealed slower increase in COF than the other two UV treated samples (UV-1.5 min., UV-1 min.) with shorter exposure times and the uncoated sample.

Figure 18:
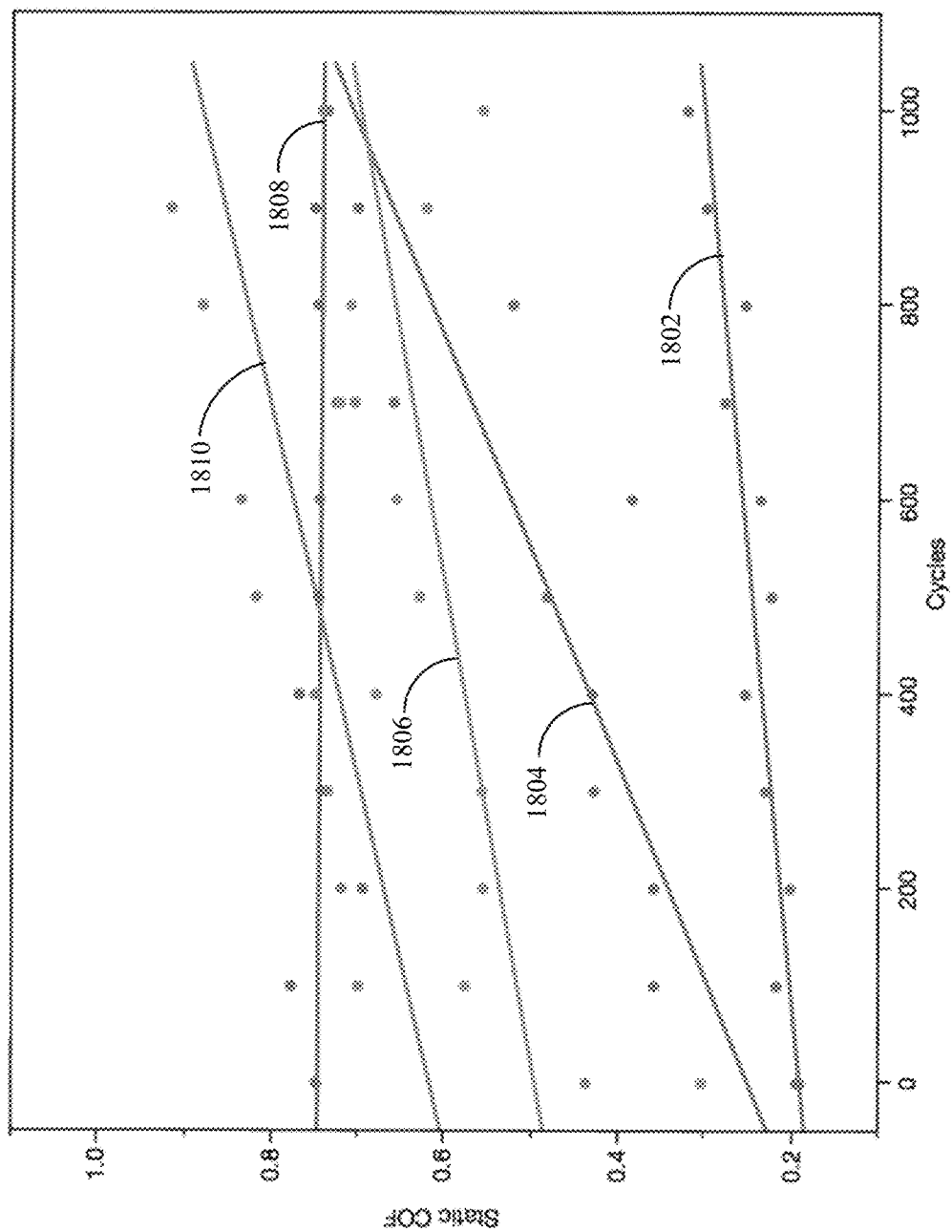
FIG. 18 illustrates static COFs versus numbers of cycles in accordance with an embodiment of the disclosure.

FIG. 18 illustrates static COFs versus number of cycles in accordance with an embodiment of the disclosure. Labels 1802, 1804, 1806, 1808, and 1810 represent samples UV-2 min., S2, UV-2 min.+S1, uncoated (i.e. no UV and no soft touch coating), and S1, respectively.

The UV treated sample UV8 showed the lowest COF at both T0 and 1000 cycles of Martindale abrasion. The UV treated samples with and without soft touch coating (UV-2 min. and UV-2 min.+S1) both showed much slower increase in COF than the samples with soft touch coating only (S1 and S2).

The soft touch coating (S1) showed highest COF among all coated samples, but UV treatment (UV-2 min.+S1) helped lower the COF at T0 and reduced wear rate of the coating. Sample S2 with harder soft touch coating had lower COF compared to sample S1 with softer soft touch coating, but the coating wear rate is similar to S1 without any UV treatment.

Figure 19:
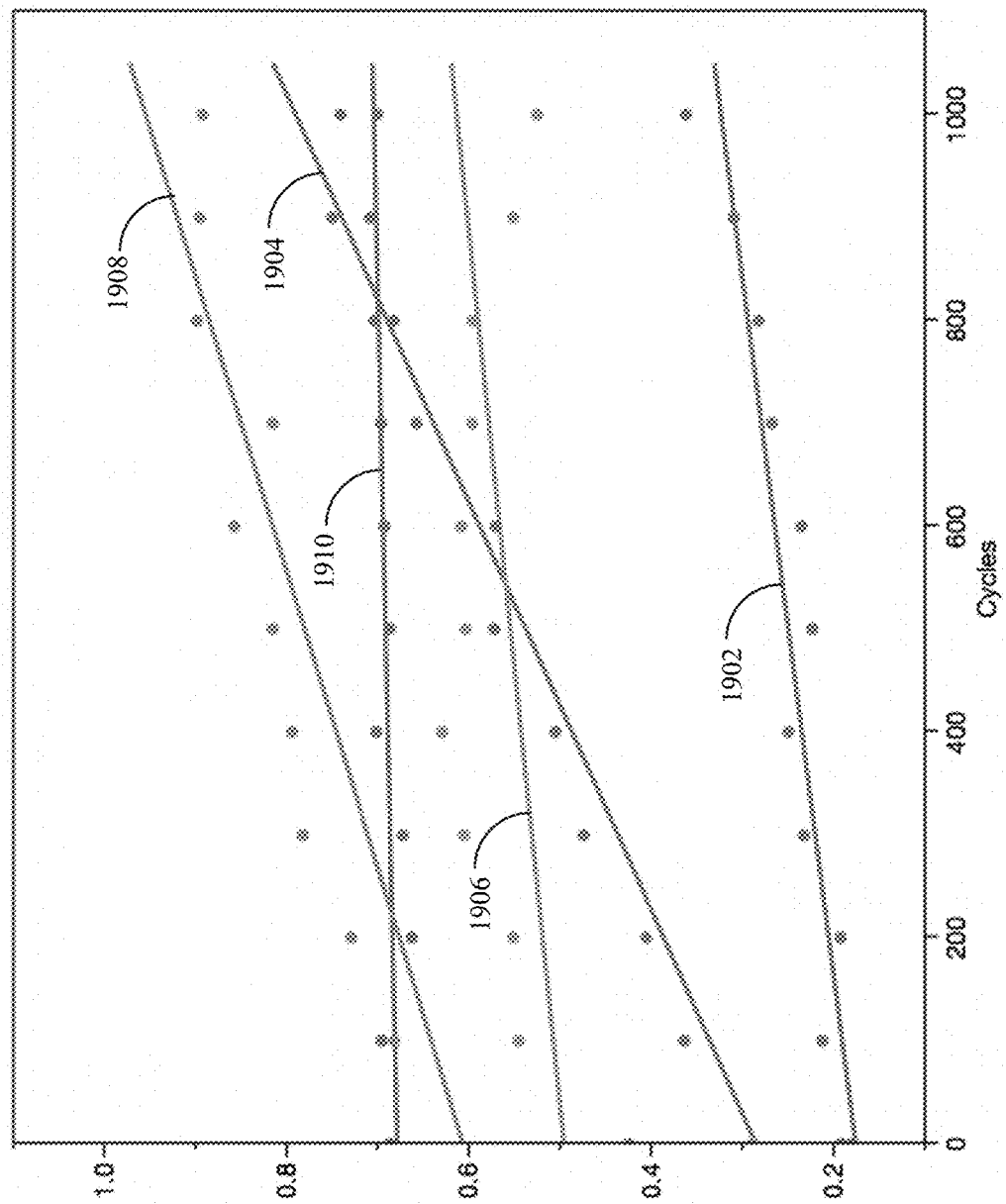
FIG. 19 illustrates kinetic COFs versus numbers of cycles in accordance with an embodiment of the disclosure.

FIG. 19 illustrates kinetic COFs versus number of cycles in accordance with an embodiment of the disclosure. Labels 1902, 1904, 1906, 1908, and 1910 represent UV-2 min., S2, UV-2 min.+S1, uncoated (i.e. no UV and no soft touch coating), and S1, respectively. The results of the kinetic COF were similar to the static COF.

Surface Energy Measurements

Experiments were performed on various samples including untreated and UV treated samples to measure contact angles, which corrected to the surface energy.

Figure 20:
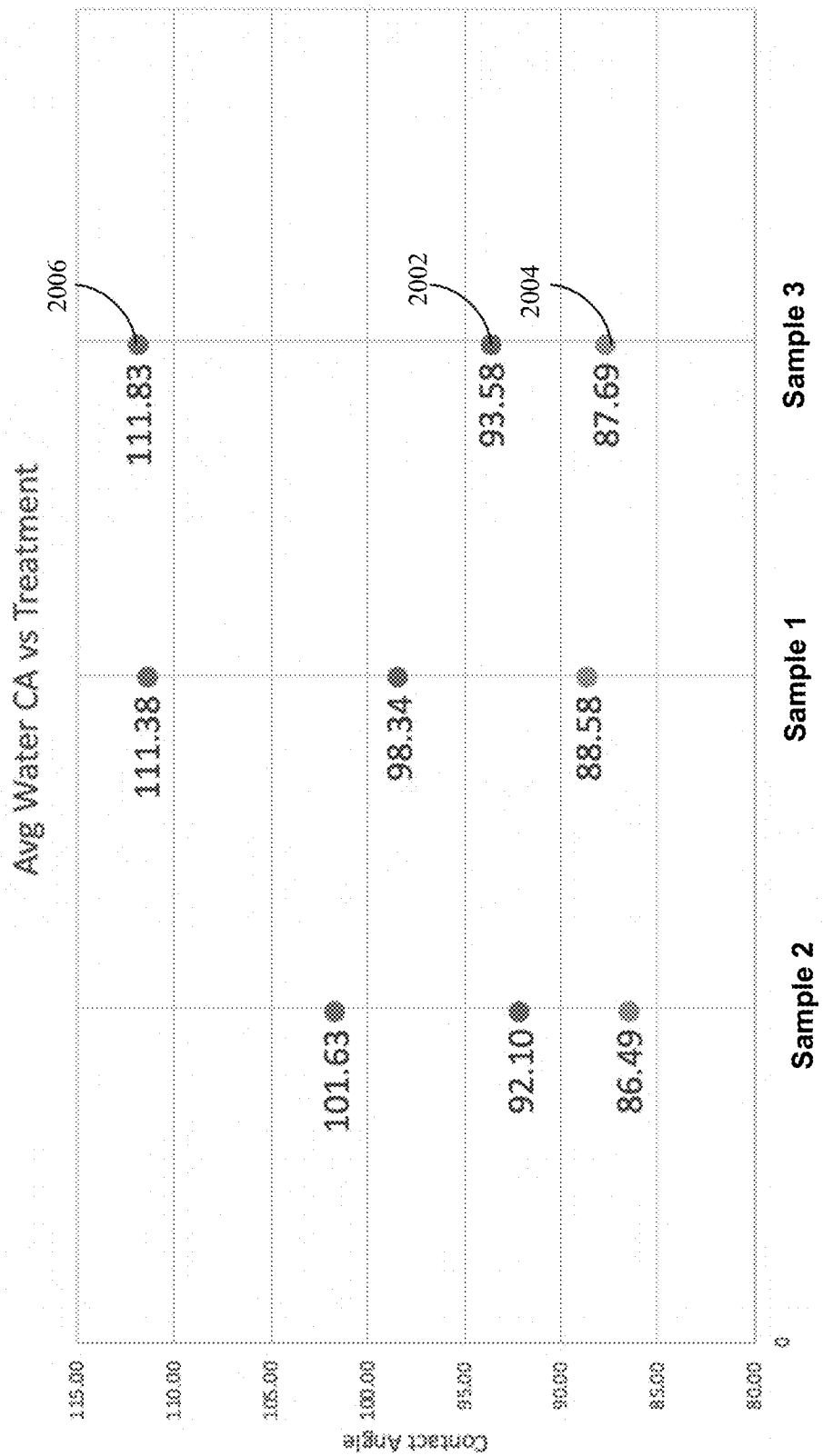
FIG. 20 illustrates water contact angles for Samples 1-3 of FIGS. 12A-C in accordance with an embodiment of the disclosure.

FIG. 20 illustrates water contact angles for Samples 1-3 (PDMS) in accordance with an embodiment of the disclosure. Dots 2004 represent UV exposure for 8 cycles (UV-4 min.). As shown, all three samples with UV exposure had the lowest contact angles, which suggested the lowest surface energy. Dots 2002 represent untreated samples, and dots 2006 represent samples having a soft surface coating without UV exposure (S1). As shown in FIG. 20, dots 2002 and 2006 had higher contact angles that the UV treated samples. Therefore, the results demonstrate that UV caused the surface energy of silicones to decrease. Also, silicones become hydrophilic after UV exposure.

The composite can be disposed on an electronic device, including a wearable electronic device. The electronic device herein can refer to any electronic device known in the art. For example, such devices can include wearable devices such as a watch (e.g. a wearable band for an AppleWatch®). The wearable device may also include phone cases, ear clips or earbuds, or headband, among others. The disclosed composites and methods can be used in the fabrication of electronic devices. Devices can also be a telephone such as a mobile phone (e.g., an iPhone®) a land-line phone, or any communication device (e.g., an electronic email sending/receiving device). The composites can be a part of a display, such as a digital display, a TV monitor, an electronic-book reader, a portable web-browser (e.g., iPad®), and a computer monitor. The composites can also be an entertainment device, including a portable DVD player, conventional DVD player, Blue-Ray disk player, video game console, music player, such as a portable music player (e.g., iPod®), etc. The composites can also be a part of a device that provides control, such as controlling the streaming of images, videos, sounds (e.g., Apple TV®), or can be a remote control for an electronic device. The composites can be a part of a computer or its accessories, such as the hard drive tower housing or casing.

In some variations, the disclosure is directed to a composite disposed on an electronic device. The composite can be disposed on the device such that the composite is configured to be in contact with an individual, such a wearer. The devices can include any device known in the art. In some variations, the device can be a medical monitoring device. In some instances, the device can be a music device or a mobile phone. In further variation, the composite can be part of a cover for a device such as an iPad.

Figure 21:
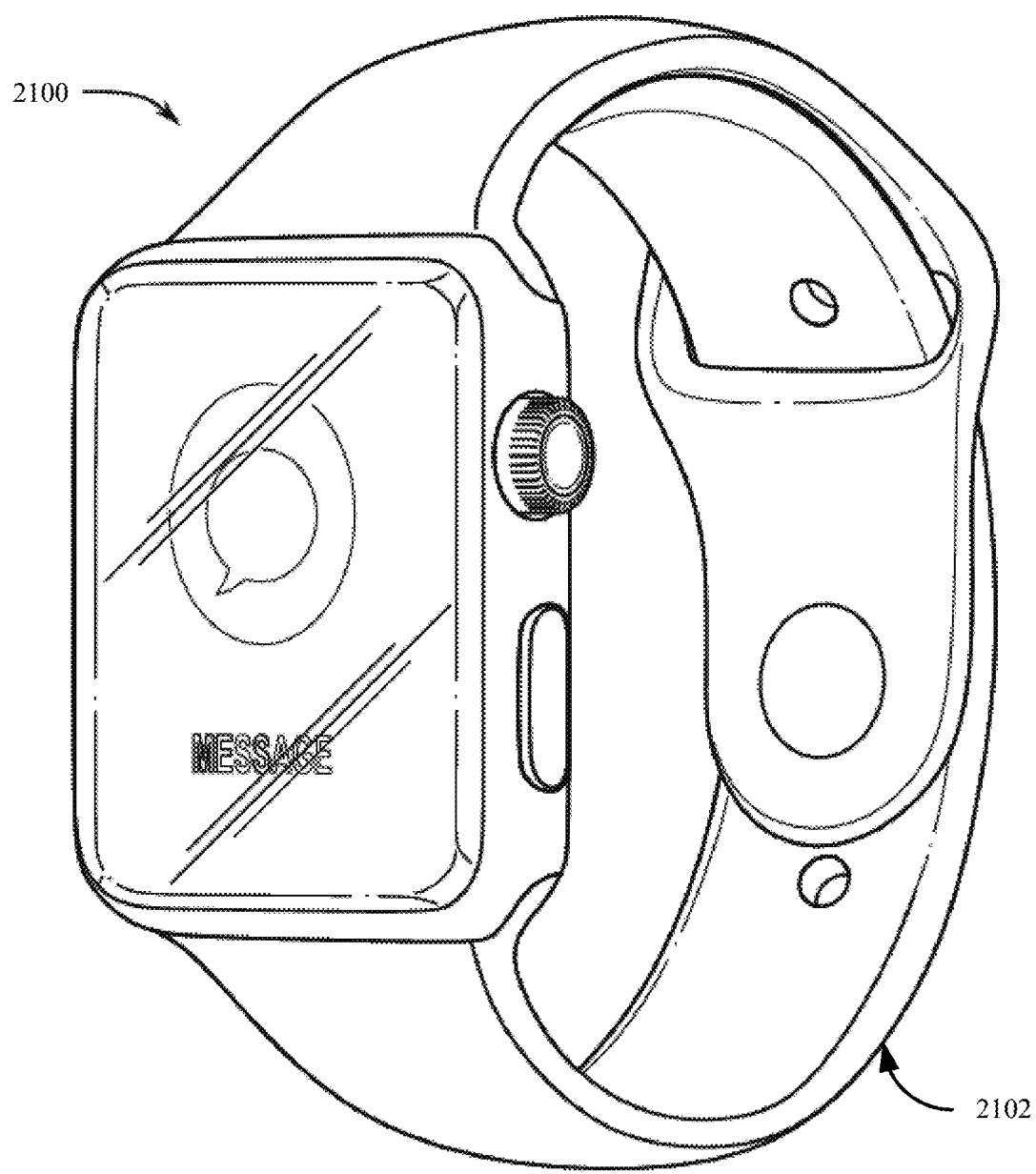
FIG. 21 illustrates a wearable band formed of the composite of FIG. 2 or FIG. 3 in accordance with an embodiment of the disclosure.

In still further variations, the device can be a wearable device, or a wearable band. For example, a band can hold a wearable device to an arm. In some variations, the disclosure provides a wearable band comprising the composite. FIG. 21 illustrates a watch 2100 and wearable band 2102 formed of the composite of FIG. 2 or FIG. 3 in accordance with an embodiment of the disclosure. Band 2102 is used to attach watch 2100 to a human wrist.

Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A composite comprising:
   an elastomer substrate;
   a layer of glass comprising $SiO_2$ formed over the elastomer substrate and cross-linked to the elastomer substrate by siloxane bonds; and
   an elastic polymer coating disposed on the layer of glass, wherein the composite can be stretched to 80% without cracking.

2. The composite of claim 1, the elastomer substrate is a silicone-based polymer.

3. The composite of claim 1, wherein the layer of glass has a thickness from 1 µm to 7 µm.

4. The composite of claim 1, wherein the composite has a coefficient of friction (COF) lower than the COF of the elastomer substrate without the layer of glass.

5. The composite of claim 1, wherein the composite has a modulus higher than the modulus of the elastomer substrate without the layer of glass.

6. The composite of claim 1, wherein the composite has an oil diffusion slower than the oil diffusion of the elastomer substrate without the layer of glass.

7. A wearable device formed of the composite of claim 1.

8. A method of fabricating a composite of claim 1, the method comprising:
   diffusing an ozone-rich gas into an elastomer substrate comprising methyl groups;
   exposing the elastomer substrate to UV radiation for a period of time; and
   converting a surface portion of the elastomer substrate into a layer of glass formed over the elastomer substrate and cross-linked to the elastomer substrate by siloxane bonds; and
   disposing an elastic polymer coating on the layer of glass to form the composite;
   wherein the composite can be stretched to 80% without cracking.

9. The method of claim 8, the elastomer substrate is a silicone-based polymer.

10. The method of claim 8, wherein the layer of glass has a thickness from 1 µm to 6 µm.

11. The method of claim 8, wherein the composite has a COF lower than the elastomer substrate without the layer of glass.

12. The method of claim 8, wherein the composite has a modulus higher than the modulus of the elastomer substrate without the layer of glass.

13. The method of claim 8, wherein the composite has an oil diffusion slower than the oil diffusion of the elastomer substrate without the layer of glass.

14. The method of claim 8, wherein the UV radiation comprises a wavelength ranging from 168 nm to 176 nm.

15. The method of claim 8, wherein the UV radiation comprises a wavelength ranging from 250 nm to 258 nm.

16. The method of claim 8, wherein the distance from a source of UV radiation to the elastomer substrate is from 1 mm to 7 mm.

17. The method of claim 8, wherein the period of time is at least 0.5 minutes.

\* \* \* \* \*